United States Patent
Fakoorian et al.

(10) Patent No.: US 11,576,172 B2
(45) Date of Patent: Feb. 7, 2023

(54) MULTIPLE CONFIGURATIONS WITH OVERLAPPING OCCASIONS

(71) Applicant: QUALCOMM Incorporated, San Diego, CA (US)

(72) Inventors: Seyed Ali Akbar Fakoorian, San Diego, CA (US); Vinay Joseph, Calicut (IN); Seyedkianoush Hosseini, San Diego, CA (US); Wei Yang, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 16/943,518

(22) Filed: Jul. 30, 2020

(65) Prior Publication Data

US 2021/0068105 A1   Mar. 4, 2021

Related U.S. Application Data

(60) Provisional application No. 62/981,905, filed on Feb. 26, 2020, provisional application No. 62/933,067, (Continued)

(51) Int. Cl.
*H04W 72/04* (2009.01)
*H04W 72/10* (2009.01)

(52) U.S. Cl.
CPC ....... *H04W 72/0446* (2013.01); *H04W 72/10* (2013.01)

(58) Field of Classification Search
CPC .......................... H04W 72/0446; H04W 72/10
See application file for complete search history.

(56) References Cited

U.S. PATENT DOCUMENTS

2018/0098349 A1    4/2018 Sun et al.
2019/0268936 A1*   8/2019 Sun .................. H04W 72/14

OTHER PUBLICATIONS

Ericsson: "On Intra-UE Prioritization Enablers", 3GPP Draft, R1-1904130, 3GPP TSG RAN WG1 Meeting #96 bis, On Intra-UE Prioritization Enablers, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 3, 2019 (Apr. 3, 2019), XP051707131, 10 Pages, Retrieved from the Internet: URL: http://www.3gpp.org/ftp/tsg%5Fran/WG1%5FRL1/TSGR1%5F96b/Docs/R1%2D1904130%2Ezip [retrieved on Apr. 3, 2019] Section 2.4, p. 8.

(Continued)

*Primary Examiner* — Melvin C Marcelo
(74) *Attorney, Agent, or Firm* — Holland & Hart LLP

(57) ABSTRACT

Methods, systems, and devices for wireless communications are described. A user equipment (UE) may identify an overlap in time between at least a first occasion and a second occasion in a slot. In some cases, the first occasion may be semi-persistently scheduled for the UE according to a first configuration associated with a first priority level, and the second occasion may be semi-persistently scheduled for the UE according to a second configuration associated with a second priority level. The UE may apply, based on the identified overlap, a conflict resolution rule to the first occasion and the second occasion based on the first priority level for the first occasion and the second priority level for the second occasion, communicate in the slot using the first occasion, and refrain from communicating in the slot using the second occasion based on applying the conflict resolution rule.

48 Claims, 20 Drawing Sheets

Related U.S. Application Data filed on Nov. 8, 2019, provisional application No. 62/891,904, filed on Aug. 26, 2019.

(56) References Cited

OTHER PUBLICATIONS

International Search Report and Written Opinion—PCT/US2020/044597—ISA/EPO—dated Oct. 1, 2020.

Spreadtrum Communications: "Discussion on DL SPS Enhancements for URLLC", 3GPP Draft, R1-1908945, 3GPP TSG RAN WG1 Meeting #98, Discussion on DL SPS Enhancements for URLLC, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051765551, 4 Pages, Retrieved from the Internet: URL: http://www.3gpp.org/ftp/tsg_ran/WG1_RL1/TSGR1_98/Docs/R1-1908945.zip [retrieved on Aug. 17, 2019] Section 2.2, p. 2.

VIVO: "Other Issues for URLLC", 3GPP Draft, 3GPP TSG RAN WG1 #98, R1-1908164—Other Issues forURLLC, 3rd Generation Partnership Project, (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051764783, 9 Pages, Retrieved from the Internet: URL: http://www.3gpp.org/ftp/tsg_ran/WG1_RL1/TSGR_98/Docs/R1-1908164.zip [retrieved on Aug. 17, 2019] Section 3, p. 3-p. 4, Figure 5, p. 2, Figure 3 section 4.4, p. 7.

\* cited by examiner

MULTIPLE CONFIGURATIONS WITH OVERLAPPING OCCASIONS

CROSS REFERENCE

The present application for patent claims the benefit of U.S. Provisional Patent Application No. 62/891,904 by FAKOORIAN et al., entitled "MULTIPLE CONFIGURATIONS WITH OVERLAPPING OCCASIONS," filed Aug. 26, 2019, and the benefit of U.S. Provisional Patent Application No. 62/933,067 by FAKOORIAN et al., entitled "MULTIPLE CONFIGURATIONS WITH OVERLAPPING OCCASIONS," filed Nov. 8, 2019, and the benefit of U.S. Provisional Patent Application No. 62/981,905 by FAKOORIAN et al., entitled "MULTIPLE CONFIGURATIONS WITH OVERLAPPING OCCASIONS," filed Feb. 26, 2020, each of which is assigned to the assignee hereof, and each of which is expressly incorporated by reference herein.

BACKGROUND

The following relates generally to wireless communications, and more specifically to multiple configurations with overlapping occasions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support multiple configurations with overlapping occasions. Generally, the described techniques provide for efficiently supporting overlapping occasions of multiple active semi-persistent scheduling configurations. According to one or more aspects of the present disclosure, a base station and a user equipment (UE) may support multiple active semi-persistent scheduling configurations. In some cases, a UE may identify an overlap between at least a first occasion and a second occasion in a slot. For instance, the UE may identify that the first occasion overlaps in time (and potentially in time) with the second occasion. In some cases, the first occasion may be semi-persistently scheduled for the UE according to a first configuration and the second occasion may be semi-persistently scheduled for the UE according to a second configuration associated. Additionally, the first configuration may be associated with a first periodicity and the second configuration may be associated with a second periodicity. In some cases, the first and second periodicities may be the same periodicity or different periodicities. Upon identifying the overlap, the UE may apply a conflict resolution rule to the first occasion and the second occasion. In some examples, the UE may communicate in the slot using the first occasion based on applying the conflict resolution rule, and refrain from communicating in the slot using the second occasion based on applying the conflict resolution rule.

A method of wireless communication at a UE is described. The method may include identifying an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level, applying, based on the identified overlap, a conflict resolution rule to the first occasion and the second occasion based on the first priority level for the first occasion and the second priority level for the second occasion, communicating in the slot using the first occasion based on applying the conflict resolution rule, and refraining from communicating in the slot using the second occasion based on applying the conflict resolution rule.

An apparatus for wireless communication at a UE is described. The apparatus may include a processor, memory coupled with the processor, and instructions stored in the memory. The instructions may be executable by the processor to cause the apparatus to identify an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level, apply, based on the identified overlap, a conflict resolution rule to the first occasion and the second occasion based on the first priority level for the first occasion and the second priority level for the second occasion, communicate in the slot using the first occasion based on applying the conflict resolution rule, and refrain from communicating in the slot using the second occasion based on applying the conflict resolution rule.

Another apparatus for wireless communication at a UE is described. The apparatus may include means for identifying an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level, applying, based on the identified overlap, a conflict resolution rule to the first occasion and the second occasion based on the first priority level for the first occasion and the second priority level for the second occasion, communicating in the slot using the first occasion based on applying the conflict resolution rule, and refraining from communicating in the slot using the second occasion based on applying the conflict resolution rule.

A non-transitory computer-readable medium storing code for wireless communication at a UE is described. The code may include instructions executable by a processor to identify an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level, apply, based on the identified overlap, a conflict resolution rule to the first occasion and the second occasion based on the first priority level for the first occasion and the second priority level for the second occasion, communicate in the slot using the first occasion based on applying the conflict resolution rule, and refrain from communicating in the slot using the second occasion based on applying the conflict resolution rule.

Some examples of the method, apparatuses, and non-transitory computer-readable medium described herein may further include operations, features, means, or instructions for identifying a first number of occasions of a shared channel that the UE is capable of receiving in the slot, and determining, based at least in part on the identified first number of occasions, a maximum number of occasions semi-persistently scheduled for the UE in the slot. In some examples of the method, apparatuses, and non-transitory computer-readable medium described herein, the slot comprises a plurality of occasions semi-persistently scheduled for the UE, including the first occasion and the second occasion, applying the conflict resolution rule to the first occasion and the second occasion further includes applying the conflict resolution rule to the plurality of occasions semi-persistently scheduled for the UE. Some examples of the method, apparatuses, and non-transitory computer-readable medium described herein may further include operations, features, means, or instructions for determining, based at least in part on the applying the conflict resolution rule, a subset of occasions of the plurality of occasions, the subset including at least the first occasion, determining that a second number of the subset of occasions exceeds the maximum number of occasions, and communicating in the slot using the maximum number of occasions of the subset of occasions based at least in part on the comparing. In some examples of the method, apparatuses, and non-transitory computer-readable medium described herein, each occasion of the subset of occasions is associated with an index value, and the maximum number of occasions of the subset of occasions correspond to a lowest set of index values. Some examples of the method, apparatuses, and non-transitory computer-readable medium described herein may further include operations, features, means, or instructions for identifying one or more remaining occasions of the subset of occasions based at least in part on the maximum number of occasions, and refraining from communicating in the slot using the one or more remaining occasions.

Some examples of the method, apparatuses, and non-transitory computer-readable medium described herein may further include operations, features, means, or instructions for refraining from providing acknowledgement feedback for occasions semi-persistently scheduled for the UE for which the UE has not received a corresponding data channel signal.

In some examples of the method, apparatuses, and non-transitory computer-readable medium described herein, applying the conflict resolution rule may include operations, features, means, or instructions for identifying that the first priority level and the second priority level may be a same priority level, and determining that a first index value for the first occasion is smaller than a second index value for the second occasion, wherein the UE communicates in the slot using the first occasion based at least in part on the determining, and refrains from communicating in the slot using the second occasion based at least in part on the determining.

In some examples of the method, apparatuses, and non-transitory computer-readable medium described herein, applying the conflict resolution rule may include operations, features, means, or instructions for identifying that the first priority level and the second priority level may be a same priority level, and determining that a first index value for the first occasion is greater than a second index value for the second occasion, wherein the UE communicates in the slot using the first occasion based at least in part on the determining, and refrains from communicating in the slot using the second occasion based at least in part on the determining.

In some examples of the method, apparatuses, and non-transitory computer-readable medium described herein, applying the conflict resolution rule may include operations, features, means, or instructions for identifying that the first priority level and the second priority level may be a same priority level, and determining that the first occasion ends before the second occasion ends, where the UE refrains from communicating in the slot using the second occasion based on the determining and the identified overlap.

Some examples of the method, apparatuses, and non-transitory computer-readable medium described herein may further include operations, features, means, or instructions for identifying an overlap in time between the first occasion and a third occasion in the slot, the third occasion semi-persistently scheduled for the UE according to a third configuration associated with a third priority level, identifying that the first priority level may be higher than the third priority level, and refraining from communicating in the slot using the third occasion based on the conflict resolution rule and the first priority level being higher than the third priority level.

Some examples of the method, apparatuses, and non-transitory computer-readable medium described herein may further include operations, features, means, or instructions for identifying an overlap in time between the second occasion and a third occasion in the slot, where the third occasion is semi-persistently scheduled for the UE according to a third configuration associated with a third priority level and does not overlap with the first occasion, and communicating in the slot using the third occasion based on the UE refraining from communicating in the slot using the second occasion. In some examples of the method, apparatuses, and non-transitory computer-readable medium described herein, the first priority level may be higher than the third priority level.

In some examples of the method, apparatuses, and non-transitory computer-readable medium described herein, applying the conflict resolution rule may include operations, features, means, or instructions for identifying that the first priority level may be higher than the second priority level, and determining to refrain from communicating using occasions in the slot, including the second occasion, associated with the second priority level based on the conflict resolution rule and the first priority level being higher than the second priority level.

In some examples of the method, apparatuses, and non-transitory computer-readable medium described herein, applying the conflict resolution rule may include operations, features, means, or instructions for identifying that the first priority level may be higher than the second priority level, and determining to refrain from communicating using occasions in the slot, including the second occasion, associated with the second priority level that ends within a threshold number of symbols of the start of first occasion based on the conflict resolution rule and the first priority level being higher than the second priority level.

Some examples of the method, apparatuses, and non-transitory computer-readable medium described herein may further include operations, features, means, or instructions for determining, by the UE, the threshold number of symbols based on a UE capability for a subcarrier spacing for the slot. In some examples of the method, apparatuses, and non-transitory computer-readable medium described herein, the first configuration and the second configuration may be downlink semi-persistently scheduled configurations. In some examples of the method, apparatuses, and non-transitory computer-readable medium described herein, the first configuration and the second configuration may be uplink semi-configured grant configurations.

A method of wireless communication at a UE is described. The method may include receiving downlink control information indicating a first occasion in a slot for the UE to use to communicate according to a first priority level, identifying an overlap in time between at least the first occasion and a second occasion in the slot, the second occasion semi-persistently scheduled for the UE according to a configuration associated with a second priority level, applying, based on the identified overlap, a conflict resolution rule to the identified overlap based on the first priority level for the first occasion and the second priority level for the second occasion, communicating in the slot using the first occasion based on applying the conflict resolution rule, and refraining from communicating in the slot using the second occasion based on applying the conflict resolution rule.

An apparatus for wireless communication at a UE is described. The apparatus may include a processor, memory coupled with the processor, and instructions stored in the memory. The instructions may be executable by the processor to cause the apparatus to receive downlink control information indicating a first occasion in a slot for the UE to use to communicate according to a first priority level, identify an overlap in time between at least the first occasion and a second occasion in the slot, the second occasion semi-persistently scheduled for the UE according to a configuration associated with a second priority level, apply, based on the identified overlap, a conflict resolution rule to the identified overlap based on the first priority level for the first occasion and the second priority level for the second occasion, communicate in the slot using the first occasion based on applying the conflict resolution rule, and refrain from communicating in the slot using the second occasion based on applying the conflict resolution rule.

Another apparatus for wireless communication at a UE is described. The apparatus may include means for receiving downlink control information indicating a first occasion in a slot for the UE to use to communicate according to a first priority level, identifying an overlap in time between at least the first occasion and a second occasion in the slot, the second occasion semi-persistently scheduled for the UE according to a configuration associated with a second priority level, applying, based on the identified overlap, a conflict resolution rule to the identified overlap based on the first priority level for the first occasion and the second priority level for the second occasion, communicating in the slot using the first occasion based on applying the conflict resolution rule, and refraining from communicating in the slot using the second occasion based on applying the conflict resolution rule.

A non-transitory computer-readable medium storing code for wireless communication at a UE is described. The code may include instructions executable by a processor to receive downlink control information indicating a first occasion in a slot for the UE to use to communicate according to a first priority level, identify an overlap in time between at least the first occasion and a second occasion in the slot, the second occasion semi-persistently scheduled for the UE according to a configuration associated with a second priority level, apply, based on the identified overlap, a conflict resolution rule to the identified overlap based on the first priority level for the first occasion and the second priority level for the second occasion, communicate in the slot using the first occasion based on applying the conflict resolution rule, and refrain from communicating in the slot using the second occasion based on applying the conflict resolution rule.

In some examples of the method, apparatuses, and non-transitory computer-readable medium described herein, the conflict resolution rule indicates that the UE does not expect the first occasion in a slot to may have a lower priority than the second occasion in the slot based on the overlap in time, the first occasion being indicated by downlink control information, and the second occasion being semi-persistently scheduled. In some examples of the method, apparatuses, and non-transitory computer-readable medium described herein, applying the conflict resolution rule may include operations, features, means, or instructions for identifying that the first priority level and the second priority level may be a same priority level, and determining to refrain from communicating in the slot using the second occasion based on the conflict resolution rule and the first priority level and the second priority level being the same priority level.

In some examples of the method, apparatuses, and non-transitory computer-readable medium described herein, applying the conflict resolution rule may include operations, features, means, or instructions for identifying that the first priority level may be higher than the second priority level, and determining to refrain from communicating in the slot using the second occasion based on the conflict resolution rule and the first priority level being higher than the second priority level.

Some examples of the method, apparatuses, and non-transitory computer-readable medium described herein may further include operations, features, means, or instructions for identifying an overlap in time between the first occasion and a third occasion in the slot, the third occasion semi-persistently scheduled for the UE according to a third configuration associated with a third priority level, identifying that the first priority level may be a same priority level or higher than the third priority level, and refraining from communicating in the slot using the third occasion based on the conflict resolution rule and the first priority level being the same priority level or higher than the third priority level.

Some examples of the method, apparatuses, and non-transitory computer-readable medium described herein may further include operations, features, means, or instructions for identifying an overlap in time between the second occasion and a third occasion in the slot, the third occasion semi-persistently scheduled for the UE according to a third configuration associated with a third priority level, and communicating in the slot using the third occasion based on the UE refraining from communicating in the slot using the second occasion.

In some examples of the method, apparatuses, and non-transitory computer-readable medium described herein, the received downlink control information includes a downlink grant of resources for the UE indicating the first occasion, and the configuration may be a downlink semi-persistently scheduled configuration. In some examples of the method, apparatuses, and non-transitory computer-readable medium described herein, the received downlink control information includes an uplink grant of resources for the UE indicating the first occasion, and the configuration may be an uplink semi-persistently scheduled configuration.

A method of wireless communication at a base station is described. The method may include identifying that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level, identifying that the UE will apply, based on the identified overlap, a conflict resolution rule to the first occasion and the second occasion based on the first priority level for the first occasion and the second priority level for the second occasion, communicating with the UE in the slot using the first occasion based on applying the conflict resolution rule, and refraining from communicating with the UE in the slot using the second occasion based on applying the conflict resolution rule.

An apparatus for wireless communication at a base station is described. The apparatus may include a processor, memory coupled with the processor, and instructions stored in the memory. The instructions may be executable by the processor to cause the apparatus to identify that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level, identify that the UE will apply, based on the identified overlap, a conflict resolution rule to the first occasion and the second occasion based on the first priority level for the first occasion and the second priority level for the second occasion, communicate with the UE in the slot using the first occasion based on applying the conflict resolution rule, and refrain from communicating with the UE in the slot using the second occasion based on applying the conflict resolution rule.

Another apparatus for wireless communication at a base station is described. The apparatus may include means for identifying that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level, identifying that the UE will apply, based on the identified overlap, a conflict resolution rule to the first occasion and the second occasion based on the first priority level for the first occasion and the second priority level for the second occasion, communicating with the UE in the slot using the first occasion based on applying the conflict resolution rule, and refraining from communicating with the UE in the slot using the second occasion based on applying the conflict resolution rule.

A non-transitory computer-readable medium storing code for wireless communication at a base station is described. The code may include instructions executable by a processor to identify that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level, identify that the UE will apply, based on the identified overlap, a conflict resolution rule to the first occasion and the second occasion based on the first priority level for the first occasion and the second priority level for the second occasion, communicate with the UE in the slot using the first occasion based on applying the conflict resolution rule, and refrain from communicating with the UE in the slot using the second occasion based on applying the conflict resolution rule.

A method of wireless communication at a base station is described. The method may include transmitting downlink control information indicating a first occasion in a slot for a UE to use to communicate according to a first priority level, identifying that there will be an overlap in time between at least the first occasion and a second occasion in the slot, the second occasion semi-persistently scheduled for the UE according to a configuration associated with a second priority level, identifying that the UE will apply, based on the identified overlap, a conflict resolution rule to the identified overlap based on the first priority level for the first occasion and the second priority level for the second occasion, communicating with the UE in the slot using the first occasion based on applying the conflict resolution rule, and refraining from communicating with the UE in the slot using the second occasion based on applying the conflict resolution rule.

An apparatus for wireless communication at a base station is described. The apparatus may include a processor, memory coupled with the processor, and instructions stored in the memory. The instructions may be executable by the processor to cause the apparatus to transmit downlink control information indicating a first occasion in a slot for a UE to use to communicate according to a first priority level, identify that there will be an overlap in time between at least the first occasion and a second occasion in the slot, the second occasion semi-persistently scheduled for the UE according to a configuration associated with a second priority level, identify that the UE will apply, based on the identified overlap, a conflict resolution rule to the identified overlap based on the first priority level for the first occasion and the second priority level for the second occasion, communicate with the UE in the slot using the first occasion based on applying the conflict resolution rule, and refrain from communicating with the UE in the slot using the second occasion based on applying the conflict resolution rule.

Another apparatus for wireless communication at a base station is described. The apparatus may include means for transmitting downlink control information indicating a first occasion in a slot for a UE to use to communicate according to a first priority level, identifying that there will be an overlap in time between at least the first occasion and a second occasion in the slot, the second occasion semi-persistently scheduled for the UE according to a configuration associated with a second priority level, identifying that the UE will apply, based on the identified overlap, a conflict resolution rule to the identified overlap based on the first priority level for the first occasion and the second priority level for the second occasion, communicating with the UE in the slot using the first occasion based on applying the conflict resolution rule, and refraining from communicating with the UE in the slot using the second occasion based on applying the conflict resolution rule.

A non-transitory computer-readable medium storing code for wireless communication at a base station is described. The code may include instructions executable by a processor to transmit downlink control information indicating a first occasion in a slot for a UE to use to communicate according to a first priority level, identify that there will be an overlap in time between at least the first occasion and a second occasion in the slot, the second occasion semi-persistently scheduled for the UE according to a configuration associated with a second priority level, identify that the UE will apply, based on the identified overlap, a conflict resolution rule to the identified overlap based on the first priority level for the first occasion and the second priority level for the second occasion, communicate with the UE in the slot using the first occasion based on applying the conflict resolution rule, and refrain from communicating with the UE in the slot using the second occasion based on applying the conflict resolution rule.

DETAILED DESCRIPTION

Figure 1:
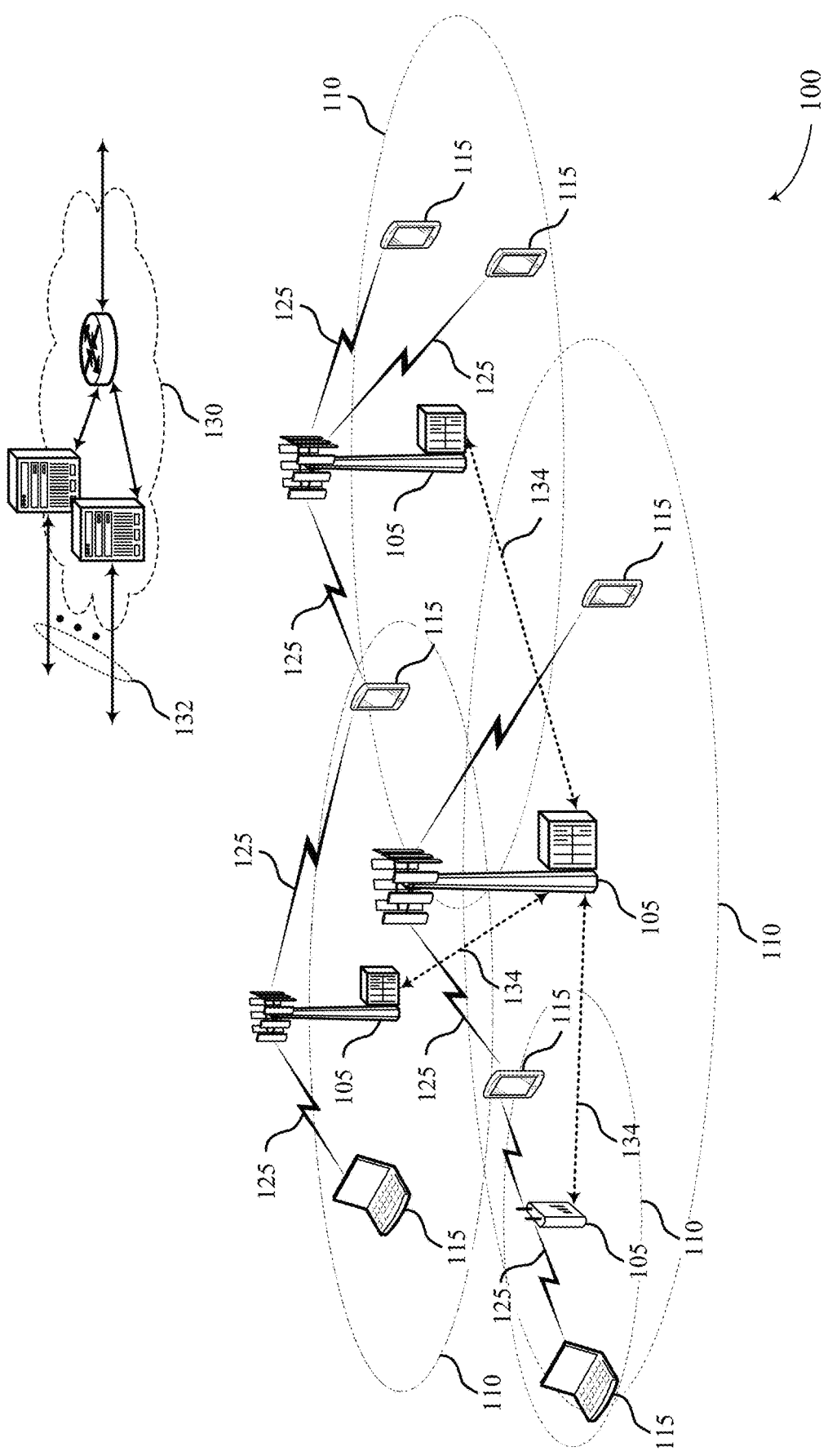
FIG. 1 illustrates an example of a wireless communications system that supports multiple configurations with overlapping occasions in accordance with aspects of the present disclosure.

A wireless communications network may support semi-persistent scheduling for uplink and downlink communications. A base station may schedule and allocate resources for a UE, such that the UE may transmit and receive messages on the allocated resources. In some examples, the scheduled and allocated resources may be indicated to the UE in a scheduling grant carried in a subframe transmitted from the base station. However, for services such as voice over IP (VoIP), the packet size is usually small, and the inter-arrival time of the packets may be constant. To reduce overhead in such operations, instead of allocating resources periodically, the base station may use semi-persistent scheduling to allocate resources to the UE at once. The UE may then be configured to use these resources at a set periodicity. In some wireless communications systems, the base station may configure a semi-persistent scheduling, configured scheduling, or a configured grant scheme to schedule resources semi-statically that may be used for the periodic traffic (e.g., autonomous transmission configuration). However, multiple active semi-persistent scheduling configurations, each with different periodicities (e.g., given by an integer number of slots), may result in overlapping semi-persistent scheduling occasions within a slot.

Rules to resolve conflicts are desired, where it may be preferable to favor higher priority traffic over lower priority traffic. Existing techniques may allow the UE to ignore any overlapping occasions, but allowing communication on at least some of the occasions may improve communications efficiency, and allow higher priority traffic over lower priority traffic.

To efficiently support multiple semi-persistent scheduling configurations, aspects of the present disclosure provides for a conflict resolution rule. In some cases, a UE may identify an overlap in time between at least a first occasion and a second occasion in a slot. In some cases, the first occasion may be semi-persistently scheduled for the UE according to a first configuration and the second occasion may be semi-persistently scheduled for the UE according to a second configuration associated. The slot may be uplink or downlink, and the first configuration and second configuration both downlink SPS configurations, or the first configuration and second configuration both uplink SPS configurations (e.g., uplink configured grants). Additionally, the first configuration may be associated with a first priority level and the second configuration may be associated with a second priority level. Upon identifying the overlap, the UE may apply a conflict resolution rule to the first occasion and the second occasion. For example, the UE may communicate in the slot using the first occasion, and refrain from communicating during the second occasion based on applying the conflict resolution rule.

Aspects of the disclosure are initially described in the context of a wireless communications system. Aspects of the disclosure are further illustrated by and described with reference to apparatus diagrams, system diagrams, and flowcharts that relate to multiple configurations with overlapping occasions.

FIG. 1 illustrates an example of a wireless communications system 100 that supports multiple configurations with overlapping occasions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station may use semi-persistent scheduling to allocate resources to a UE, and the UE may be configured to use these resources at a set periodicity. In some wireless communications systems, the base station may configure a semi-persistent scheduling, configured scheduling, or a configured grant scheme to schedule resources semi-statically that may be used for the periodic traffic (e.g., autonomous transmission configuration). Currently wireless communications system (such as, wireless communications system 100) support multiple active semi-persistent scheduling configurations. In some cases, active semi-persistent scheduling configurations may be associated with different periodicities. Thus, multiple active semi-persistent scheduling configurations, each with different periodicities, may result in overlapping semi-persistent scheduling occasions within a slot, and methods for efficiently handling the overlapping occasions may be desired.

According to one or more aspects of the present disclosure, a UE 115 may identify an overlap between at least a first occasion and a second occasion in a slot. In some cases, the first occasion may be semi-persistently scheduled for the UE 115 according to a first configuration and the second occasion may be semi-persistently scheduled for the UE 115 according to a second configuration associated. Upon identifying the overlap, the UE 115 may apply a conflict resolution rule to the first occasion and the second occasion. In some examples, the UE 115 may communicate in the slot using the first occasion based on applying the conflict resolution rule, and refrain from communicating in the slot using the second occasion based on applying the conflict resolution rule.

Figure 2:
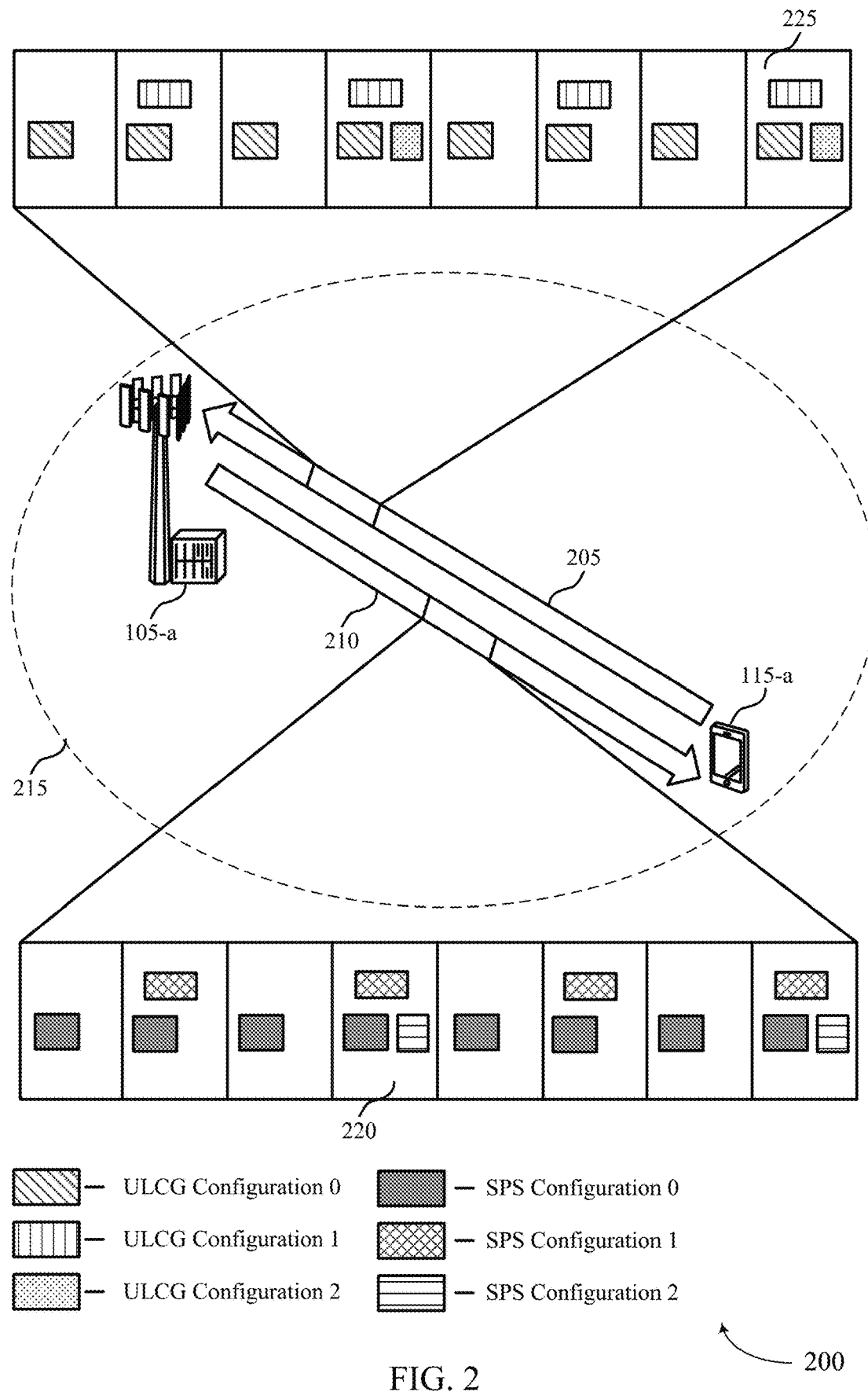
FIG. 2 illustrates an example of a wireless communications system that supports multiple configurations with overlapping occasions in accordance with aspects of the present disclosure.

FIG. 2 illustrates an example of a wireless communications system 200 that supports multiple configurations with overlapping occasions in accordance with aspects of the present disclosure. In some examples, the wireless communications system 200 may implement aspects of the wireless communications system 100. Wireless communications system 200 may include a base station 105-*a* and a UE 115-*a*, which may be examples of corresponding base stations 105 and UEs 115, respectively, as described above with reference to FIG. 1.

Base station 105-*a* and UE 115-*a* may operate within geographical area 215. Base station 105-*a* may transmit downlink messages to UE 115-*a* on resources of a carrier 205, and UE 115-*a* may transmit uplink messages to base station 105-*a* on resources of a carrier 210. In some cases, carriers 205 and 210 may be a same carrier or may be separate carriers. Exemplary downlink and uplink data transmissions are shown in detail with reference to FIGS. 3 through 8.

As described herein, UE 115-*a* may support multiple active downlink semi-persistent scheduling configurations. In some examples, multiple active downlink semi-persistent scheduling configurations may be associated with different data flows. For example, the active downlink semi-persistent scheduling configurations may be associated with data flows having same or different periodicities. Additionally or alternatively, multiple active downlink semi-persistent scheduling configurations may be used to handle multiple data flows, or support different service types (such as, ultra-reliable low-latency communication (URLLC) and enhanced Mobile Broadband (eMBB)). Similarly, the UE 115-*a* may support configurations for multiple active uplink configuration grants. Additionally, in NR systems (e.g., wireless communications system 200), the UE 115-*a* may support shorter downlink semi-persistent scheduling periodicities. For instance, an occasion may be semi-persistently scheduled at a periodicity of a slot (or less than a slot). However, multiple active semi-persistent scheduling configurations with different periodicities may result semi-persistent scheduling occasions to overlap in time.

As depicted in the example of FIG. 2, the UE 115-*a* may receive a first semi-persistent scheduling configuration associated with a first periodicity, a second semi-persistent scheduling configuration associated with a second periodicity, and a third semi-persistent scheduling configuration associated with a third periodicity. For example, an occasion associated with the first semi-persistent scheduling configuration (Configuration 0) may be configured to be scheduled during every slot, an occasion associated with the second semi-persistent scheduling configuration (Configuration 1) may be configured to be scheduled during every other slot, and an occasion associated with the third semi-persistent scheduling configuration (Configuration 2) may be configured to be scheduled once in every four slots. This results in an overlap in multiple slots. For instance, the UE may identify an overlap between the occasion associated with the first semi-persistent scheduling configuration and the occasion associated with the second semi-persistent scheduling configuration in every other slot. Similarly, the UE may identify an overlap between the occasion associated with the first semi-persistent scheduling configuration, the occasion associated with the second semi-persistent scheduling configuration, and the occasion associated with the third semi-persistent scheduling configuration once in every four slots (e.g., slot 220).

Additionally or alternatively, the UE 115-*a* may transmit a first uplink configured grant associated with a first periodicity, a second uplink configured grant associated with a second periodicity, and a third uplink configured grant associated with a third periodicity. For example, the UE 115-*a* may be configured to transmit an occasion associated with the first uplink configured grant (Configuration 0) during every slot, an occasion associated with the second uplink configured grant (Configuration 1) during every other slot, and an occasion associated with the third uplink configured grant (Configuration 2) once in every four slots. As discussed with reference to semi-persistent scheduling, the UE may identify an overlap between the occasion associated with the first uplink configured grant and the occasion associated with the second uplink configured grant in every other slot. Similarly, the UE may identify an overlap between the occasion associated with the first uplink configured grant, the occasion associated with the second uplink configured grant, and the occasion associated with the third uplink configured grant once in every four slots (e.g., slot 225).

To support shorter periodicities for downlink semi-persistent scheduling and efficiently process overlapping occasions, the UE 115-*a* may be configured to communicate according to a conflict resolution rule. For example, the UE 115-*a* may determine whether to communicate during an occasion within a slot based on the conflict resolution rule. Various examples of the conflict resolution rule are described with reference to FIGS. 3 through 9.

In the various examples described herein, UE 115-*a* does not need to provide acknowledgement feedback (e.g., HARQ positive acknowledgment (ACK) or negative acknowledgment (NACK)) for SPS occasions without PDCCH correspondence that UE 115-*a* does not expect to receive SPS PDSCH. As such, UE 115-*a* may refrain from providing acknowledgement feedback for occasions semi-persistently scheduled for the UE 115-a for which the UE 115-a has not received a corresponding data channel signal.

Figure 3:
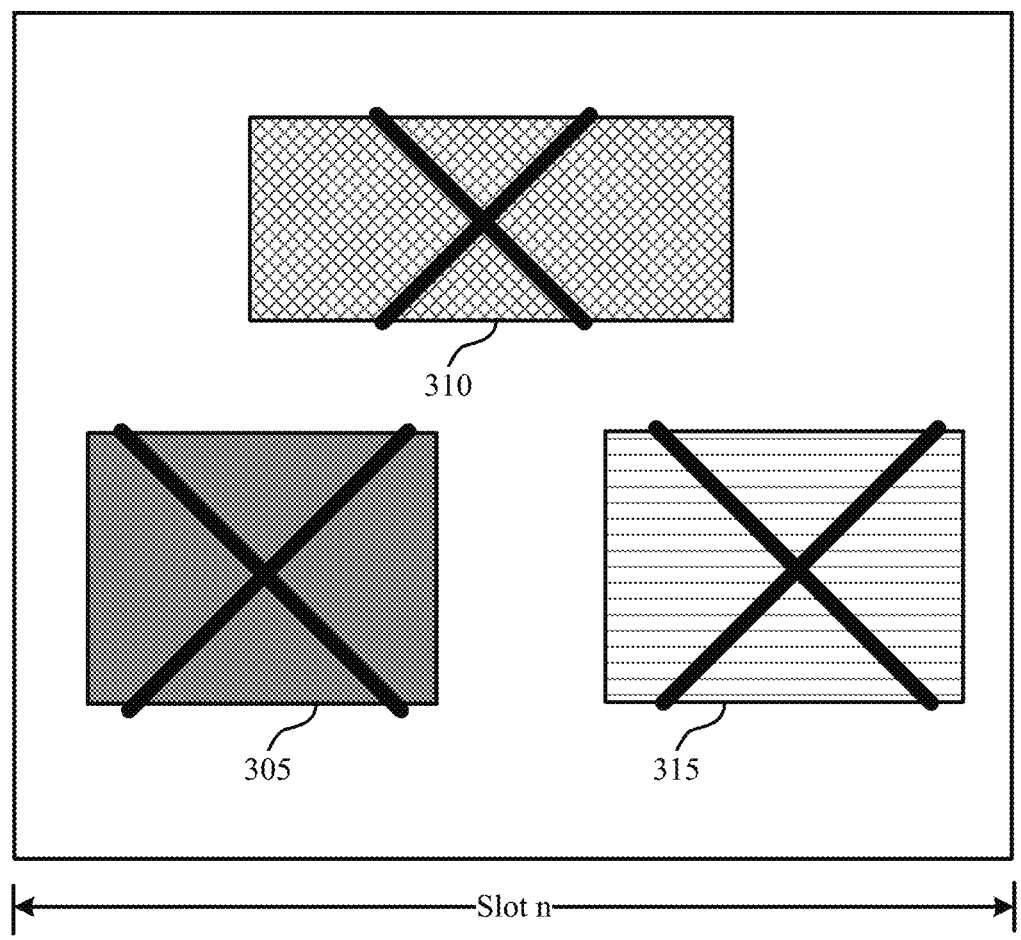
FIG. 3 illustrates an example of a time period that supports multiple configurations with overlapping occasions in accordance with aspects of the present disclosure.

FIG. 3 illustrates an example of a time period 300 that supports multiple configurations with overlapping occasions in accordance with aspects of the present disclosure. In some examples, the time period 300 may implement aspects of the wireless communications system 100 as described with reference to FIG. 1 and the wireless communications system 200 as described with reference to FIG. 2. The time period 300 may be an example of a slot n. In the example of FIG. 3, the time period 300 illustrates procedures for communicating according to a conflict resolution rule to facilitate multiple semi-persistent scheduling occasions scheduled by a base station for a UE, which may be examples of the corresponding devices as described with reference to FIG. 1.

The time period 300 shows a time unit (e.g., slot n) that includes multiple occasions associated with semi-persistent scheduling. Although depicted as a slot in the example of FIG. 3, it may be understood that the time unit may include, for example, any type of scheduling units for wireless communications, such as slots, mini-slots, a combination of slots and mini-slots, frames, subframes, symbol groups, and the like. The example time period 300 of FIG. 3 shows three occasions associated with semi-persistent scheduling, but it is to be understood that the techniques described herein may be similarly applied across any greater or lesser number of occasions. The base station and the UE may communicate uplink and/or downlink transmissions during the slot n.

In some examples, during a slot, the UE may identify an overlap in time between at least a first occasion and a second occasion. As depicted in the example of FIG. 3, the UE may identify an overlap between the first occasion 305 and the second occasion 310. Additionally, the UE may identify an overlap between the second occasion 310 and a third occasion 315. In some cases, the first occasion may be semi-persistently scheduled for the UE according to a first configuration, the second occasion may be semi-persistently scheduled for the UE according to a second configuration and the third occasion may be semi-persistently scheduled for the UE according to a third configuration. For instance, the first occasion 305 may be semi-persistently scheduled according to Configuration 0, the second occasion 310 may be semi-persistently scheduled according to Configuration 1, and the third occasion 315 may be semi-persistently scheduled according to Configuration 2. In some examples, each occasion may also be associated with a priority level (such as, a priority level associated with the data traffic scheduled during the occasion). In the example of FIG. 3, each occasion is associated with the same priority level. That is, the first occasion 305, the second occasion 310, and the third occasion 315 are associated with the same priority level. In some instances, the UE may be configured to receive indications of the priority level using radio resource signals. Additionally or alternatively, the base station may indicate the priority levels (e.g., the priority levels associated with each of the first occasion 305, the second occasion 310, and the third occasion 315) using an activation downlink control information.

Upon identifying the overlap in time between the occasions (such as, the first occasion 305, the second occasion 310, and the third occasion 315), the UE may apply a conflict resolution rule to the overlapped occasions. For instance, the UE may determine an occasion for communicating, based on the conflict resolution rule. In some cases, the conflict resolution rule may configure the UE to ignore all overlapping occasions. That is, the UE may not receive or may not expect to receive data on any of the overlapping occasions. As depicted herein, the UE may identify an overlap between the first occasion 305 and the second occasion 310, and may ignore both the first occasion 305 and the second occasion 310. Additionally, the UE may identify an overlap between the second occasion 310 and the third occasion 315, and may also ignore the third occasion 315. Thus, the UE may refrain from communicating in the slot using the first occasion 305, the second occasion 310, and the third occasion 315 based on applying the conflict resolution rule. In some cases, the UE may not provide acknowledgement feedback (such as, a positive or negative acknowledgement) associated with the ignored occasions. In the example of FIG. 3, the UE may not provide acknowledgement feedback (such as, a negative acknowledgement) associated with the first occasion 305, the second occasion 310, and the third occasion 315. The lack of providing acknowledgement feedback may be inefficient during a first semi-persistent scheduling occasion (as the base station is unable to determine whether the UE has missed the activation associated with the first semi-persistent scheduling occasion). Therefore in some instances, the UE may not expect a first semi-persistent scheduling occasion corresponding to a first configuration to overlap with another semi-persistent scheduling occasion corresponding to a second configuration.

Although the configurations (e.g., first configuration, second configuration, and third configuration) are described with reference to downlink semi-persistently scheduled configurations, it may be understood that the present techniques may be applied for uplink semi-persistently scheduled configurations (e.g., uplink configured grants).

Figure 4:
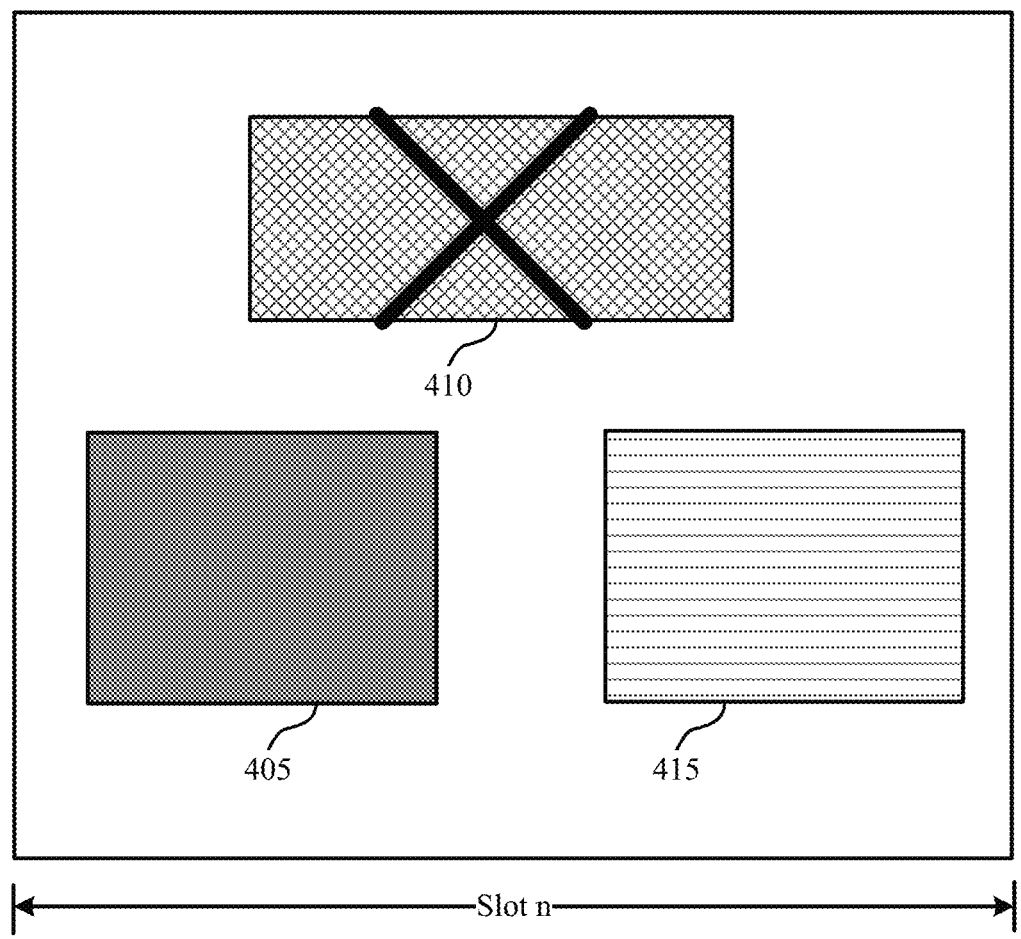
FIG. 4 illustrates an example of a time period that supports multiple configurations with overlapping occasions in accordance with aspects of the present disclosure.

FIG. 4 illustrates an example of a time period 400 that supports multiple configurations with overlapping occasions in accordance with aspects of the present disclosure. In some examples, the time period 400 may implement aspects of the wireless communications system 100 as described with reference to FIG. 1 and the wireless communications system 200 as described with reference to FIG. 2. The time period 400 may be an example of a slot n. In the example of FIG. 4, the time period 400 illustrates procedures for communicating according to a conflict resolution rule to facilitate multiple semi-persistent scheduling occasions scheduled by a base station for a UE, which may be examples of the corresponding devices as described with reference to FIG. 1.

The time period 400 shows a time unit (e.g., slot n) that includes multiple occasions associated with semi-persistent scheduling. Although depicted as a slot in the example of FIG. 4, it may be understood that the time unit may include, for example, any type of scheduling units for wireless communications. The example time period 400 of FIG. 4 shows three occasions associated with semi-persistent scheduling, but it is to be understood that the techniques described herein may be similarly applied across any greater or lesser number of occasions. The base station and the UE may communicate uplink and/or downlink transmissions during the slot n.

As previously described with reference to FIG. 3, the UE may identify an overlap in time between at least a first occasion and a second occasion during a slot. As depicted herein, the UE may identify an overlap between the first occasion 405 and the second occasion 410. Additionally, the UE may identify an overlap between the second occasion 410 and a third occasion 415. In some examples, the first occasion may be semi-persistently scheduled for the UE according to a first configuration, the second occasion may be semi-persistently scheduled for the UE according to a second configuration and the third occasion may be semi-persistently scheduled for the UE according to a third configuration. For instance, the first occasion 405 may be semi-persistently scheduled according to Configuration 0, the second occasion 410 may be semi-persistently scheduled according to Configuration 1, and the third occasion 415 may be semi-persistently scheduled according to Configuration 2. In some cases, the first configuration, the second configuration and the third configuration are downlink semi-persistently scheduled configurations. In some cases, the first configuration, the second configuration and the third configuration are uplink semi-persistently scheduled configurations. In some examples, each occasion may also be associated with a priority level (such as, a priority level associated with the data traffic scheduled during the occasion). In the example of FIG. 4, each occasion is associated with the same priority level. That is, the first occasion 405, the second occasion 410, and the third occasion 415 are associated with the same priority level. According to one or more aspects of the present disclosure, the UE may receive an indication of the priority levels associated with the first occasion 405, the second occasion 410, and the third occasion 415. In some cases, the indication may be included in a radio resource control signal Additionally or alternatively, the indication may be included in an activation downlink control information.

In some instances, upon identifying the overlap in time between the occasions (e.g., the first occasion 405, the second occasion 410, and the third occasion 415), the UE may apply a conflict resolution rule to the overlapped occasions. For instance, the UE may communicate within the slot (such as slot n) based on applying the conflict resolution rule. In some cases, the conflict resolution rule may configure the UE to resolve the overlapping occasions. In some cases, the UE may determine that a first occasion ends before a second occasion ends, and may communicate based on the determining. In the example of FIG. 4, the UE may identify an overlap between the first occasion 405 and the second occasion 410, and may determine that the first occasion 405 ends before the second occasion 410. The UE may then refrain from communicating in the slot using the second occasion based on the determining and the identified overlap. That is, the UE may communicate using the first occasion 405 in the slot n. Additionally, the UE may determine whether one or more remaining occasions (e.g., occasions remaining in slot n after resolving the overlap between the first occasion 405 and the second occasion 410) overlaps with the first occasions 405. In some examples, the UE may determine that the one or more remaining occasions do not overlap with the first occasions 405. In such cases, the UE may communicate in the slot using the one or more remaining occasions. As depicted in the example of FIG. 4, the UE may determine that the third occasion 415 does not overlap with the first occasions 405, and the UE may communicate in the slot using the first occasion 405 and the third occasion 415, and refrain from communicating in the slot using the second occasion 410.

In some examples, the UE does not expect to receive more than X number of occasions associated with semi-persistent scheduling (e.g., SPS PDSCH) in a slot, if by capability UE cannot receive more than Y number of unicast PDSCH per slot. In some examples, the number of occasions associated with semi-persistent scheduling is less than or equal to the UE capability to receive unicast PDSCH per slot (e.g., X≤Y). A UE may identify a first number of occasions of a shared channel (e.g., PDSCH) that the UE is capable of receiving in the slot (e.g., Y). This capability may be communicated to the base station, for example in RRC signaling. The UE may then determine, based at least in part on the identified first number of occasions (e.g., Y), a maximum number of occasions semi-persistently scheduled for the UE in the slot (e.g., where the maximum number may correspond to Y).

In some examples, the UE may apply a conflict resolution rule to overlapped occasions, according to one or more techniques described herein, and a number of occasions associated with semi-persistent scheduling (e.g., SPS occasions) may remain in the slot follows application of the conflict resolution rule. In case of more than X number of occasion associated with semi-persistent scheduling (e.g., SPS occasions) happen to be in the same slot (after resolving possible overlapping between SPS occasions), the UE expects to receive shared channel transmissions (e.g., PDSCH) on X or fewer (e.g., only on X) non-overlapping occasion associated with semi-persistent scheduling (SPS occasions). In some examples the X or fewer number of non-overlapping occasions may correspond to index values that are the smallest (e.g., the X smallest SPS indices). In some examples, the UE may apply the conflict resolution rule to the plurality of occasions semi-persistently scheduled for the UE, and determine, based at least in part on the applying the conflict resolution rule, a subset of occasions of the plurality of occasions (e.g., the SPS occasions that may remain in the slot following application of the conflict resolution rule). The UE may then determine that a second number of the subset of occasions (e.g., the number of SPS occasions that remain the slot) exceeds the maximum number of occasions (e.g., X). The UE may then communicate in the slot using the maximum number of occasions (e.g., the X occasions). In some examples, these maximum number of occasions (e.g., X) may correspond to the occasions having a lowest set of index values (e.g., the X smallest SPS indices). In some examples, the UE may not transmit or refrain from transmitting on the remaining occasions. For example, the UE may identify one or more remaining occasions of the subset of occasions (e.g., occasions outside of X) based on the maximum number of occasions (e.g., based on X), and refrain from communicating in the slot using the identified one or more remaining occasions.

Some examples of the UE applying a conflict resolution rule to the overlapped occasions follow. For instance, the UE may communicate within the slot (such as slot n) based on applying the conflict resolution rule. In some cases, the conflict resolution rule may configure the UE to resolve the overlapping occasions. In some cases, the UE may determine that a first occasion is associated with a first SPS index (e.g., have a first index value) and that a second occasion is associated with a second SPS index (e.g., have a second index value), and may communicate based on comparing the first SPS index to the second SPS index. In the example of FIG. 4, the UE may identify an overlap between the first occasion 405 and the second occasion 410, and may determine that the first occasion 405 is associated with a first SPS index that is lower (e.g., the value is less) than a second SPS index associated with the second occasion 410. The UE may then refrain from communicating in the slot using the second occasion based on the determining (e.g., the SPS index associated with the second occasion 410 being higher (e.g., the value is greater) than the SPS index associated with the first occasion 405, and the identified overlap. That is, the UE may communicate using the first occasion 405 in the slot n.

Additionally, the UE may determine whether one or more remaining occasions (e.g., occasions remaining in slot n after resolving the overlap between the first occasion 405 and the second occasion 410) overlaps with the first occasions 405. In some examples, the UE may determine that the one or more remaining occasions do not overlap with the first occasions 405. In such cases, the UE may communicate in the slot using the one or more remaining occasions, regardless of the SPS index associated with the third occasion 415. As depicted in the example of FIG. 4, the UE may determine that the third occasion 415 does not overlap with the first occasions 405, and the UE may communicate in the slot using the first occasion 405 and the third occasion 415, and refrain from communicating in the slot using the second occasion 410.

Alternatively, the conflict resolution rule may configure the UE to resolve the overlapping occasions in favor of the SPS occasion associated with the higher SPS index. In such case, in the example of FIG. 4, the UE may identify an overlap between the first occasion 405 and the second occasion 410, and may determine that the first occasion 405 is associated with a first SPS index that is lower (e.g., the value is less) than a second SPS index associated with the second occasion 410 (e.g., that the value of the SPS index associated with the second occasions is greater or higher). Based on the determining, the UE may then refrain from communicating in the slot using the first occasion 405 and the identified overlap, and may instead communicate in the slot using the second occasion 410. Additionally, the UE may determine that there is an overlap between the third occasion 415 and the second occasion 410, and that the SPS index associated with the third occasions 415 is lower than the SPS index associated with the second index 410, such that the UE determines to transmit on the second occasion 410 and refrain from transmitting on the third occasion 415 based on the determining and the overlap.

Figure 5:
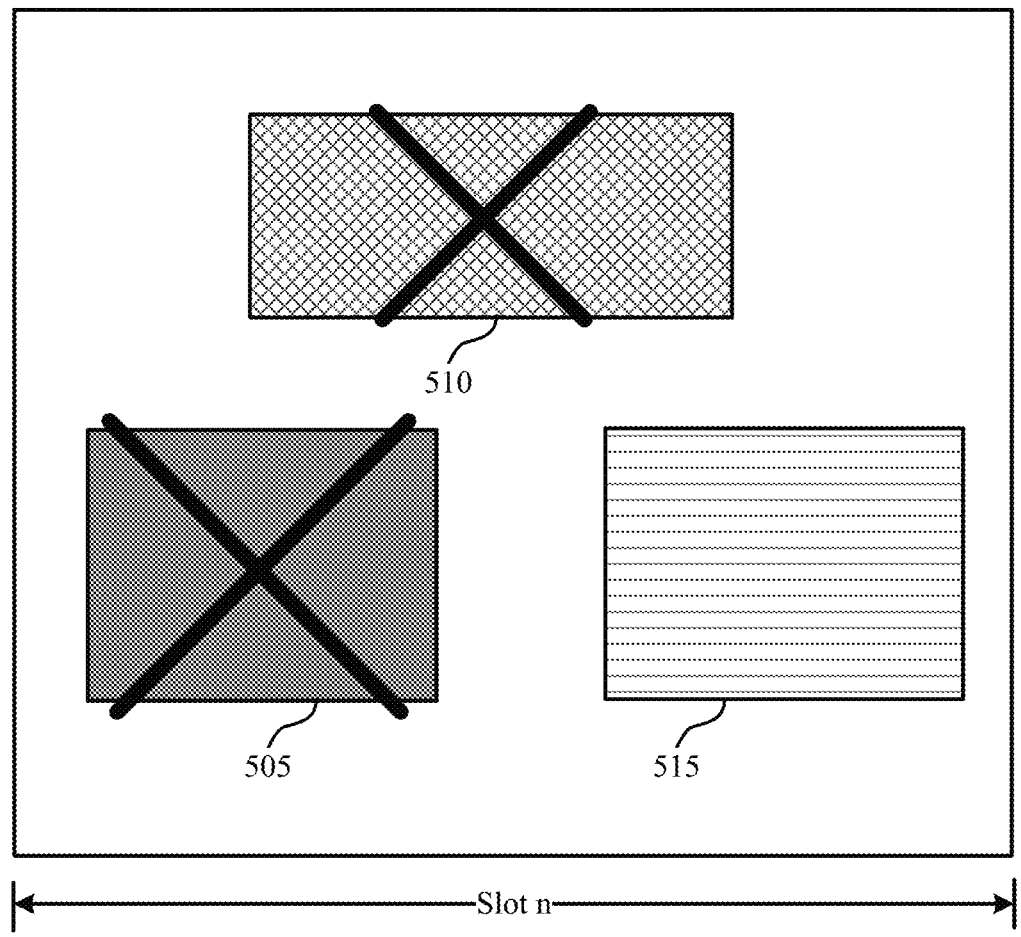
FIG. 5 illustrates an example of a time period that supports multiple configurations with overlapping occasions in accordance with aspects of the present disclosure.

FIG. 5 illustrates an example of a time period 500 that supports multiple configurations with overlapping occasions in accordance with aspects of the present disclosure. In some examples, the time period 500 may implement aspects of the wireless communications system 100 as described with reference to FIG. 1 and the wireless communications system 200 as described with reference to FIG. 2. In the example of FIG. 5, the time period 500 illustrates procedures for communicating according to a conflict resolution rule to facilitate multiple semi-persistent scheduling occasions scheduled by a base station for a UE, which may be examples of the corresponding devices as described with reference to FIG. 1.

The time period 500 shows a time unit (e.g., slot n) that includes multiple occasions associated with semi-persistent scheduling. Although depicted as a slot in the example of FIG. 5, it may be understood that the time unit may include, for example, any type of scheduling units for wireless communications, such as slots, mini-slots, a combination of slots and mini-slots, frames, subframes, symbol groups, and the like. The example time period 500 of FIG. 5 shows three occasions associated with semi-persistent scheduling, but it is to be understood that the techniques described herein may be similarly applied across any greater or lesser number of occasions. The base station and the UE may communicate uplink and/or downlink transmissions during the slot n.

According to one or more aspects of the present disclosure, the UE may identify an overlap in time between at least a first occasion and a second occasion during a slot. As depicted herein, the UE may identify a first overlap between the first occasion 505 and the second occasion 510, and a second overlap between the second occasion 510 and a third occasion 515. In some examples, the first occasion may be semi-persistently scheduled for the UE according to a first configuration, the second occasion may be semi-persistently scheduled for the UE according to a second configuration and the third occasion may be semi-persistently scheduled for the UE according to a third configuration. For example, the first occasion 505 may be semi-persistently scheduled according to Configuration 0, the second occasion 510 may be semi-persistently scheduled according to Configuration 1, and the third occasion 515 may be semi-persistently scheduled according to Configuration 2. In some cases, the first configuration, the second configuration and the third configuration are downlink semi-persistently scheduled configurations. In some cases, the first configuration, the second configuration and the third configuration are uplink semi-persistently scheduled configurations (e.g., uplink configured grants). In some examples, each of the first occasion, the second occasion, and the third occasion may be associated with a priority level (such as, a priority level associated with the data traffic scheduled during the occasion). In the example of FIG. 5, the first occasion 505 may be associated with a first priority level, the second occasion 510 may be associated with a second priority level, and the third occasion 515 may be associated with a third priority level. The third priority level may be higher than the first priority level and the second priority level. According to one or more aspects of the present disclosure, the UE may receive an indication of the priority levels associated with the first occasion 505, the second occasion 510, and the third occasion 515, in a radio resource control signal or an activation downlink control information.

In some cases, the UE may apply a conflict resolution rule to the overlapped occasions based on identifying the overlap between the first occasion 505, the second occasion 510, and the third occasion 515. In some examples, the UE may be configured to communicate within the slot (such as slot n) based on applying the conflict resolution rule. In one example, the conflict resolution rule may configure the UE to ignore occasions associated with a low priority and monitor occasions associated with a high priority. In the example of FIG. 5, the UE may determine to refrain from communicating using the first occasion 505 and the second occasion 510 based on the conflict resolution rule and the third priority level (e.g., the priority level associated with the third occasion 515) being higher than the first priority level (e.g., the priority level associated with the first occasion 505) and the second priority level (e.g., the priority level associated with the second occasion 510). Thus, by applying the conflict resolution rule, the UE may not impact the processing timeline (such as, timeline for channel estimation and data decoding) of high priority data by ignoring the occasions associated with low priority data.

Figure 6:
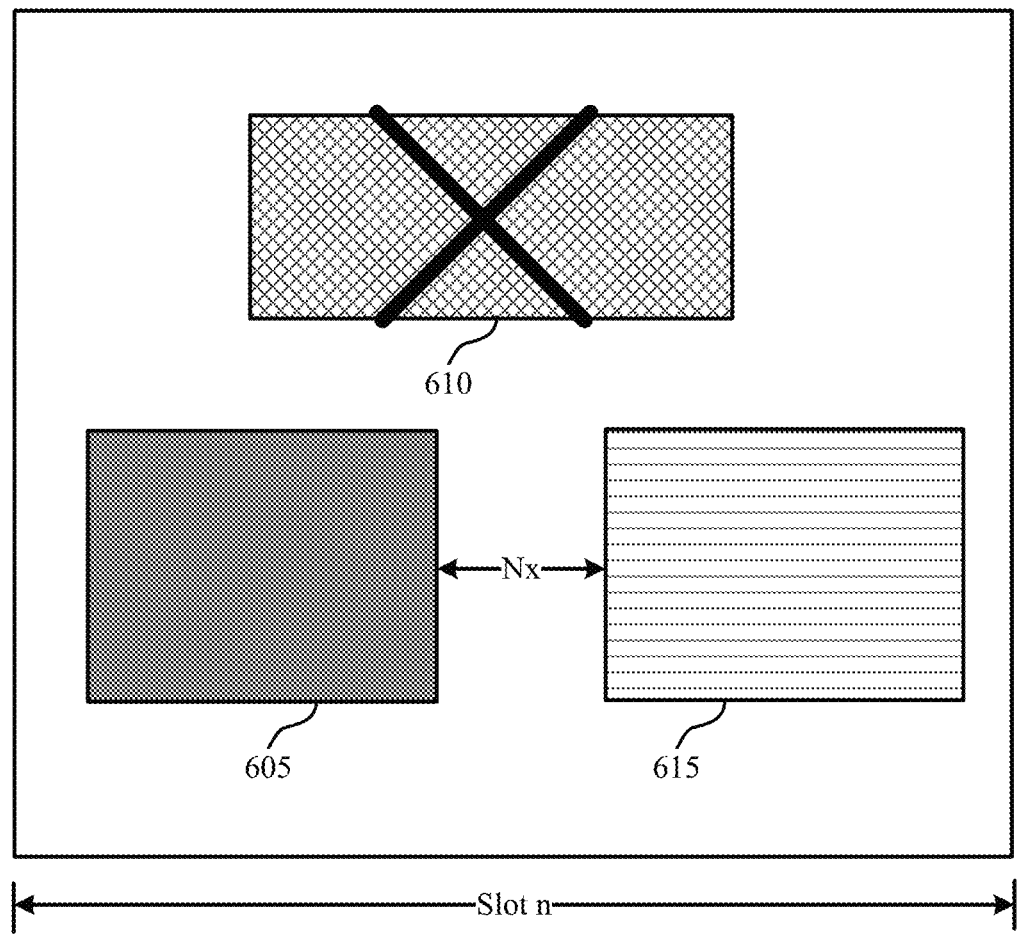
FIG. 6 illustrates an example of a time period that supports multiple configurations with overlapping occasions in accordance with aspects of the present disclosure.

FIG. 6 illustrates an example of a time period 600 that supports multiple configurations with overlapping occasions in accordance with aspects of the present disclosure. In some examples, the time period 600 may implement aspects of the wireless communications system 100 as described with reference to FIG. 1 and the wireless communications system 200 as described with reference to FIG. 2. In the example of FIG. 6, the time period 600 illustrates procedures for communicating according to a conflict resolution rule to facilitate multiple semi-persistent scheduling occasions scheduled by a base station for a UE, which may be examples of the corresponding devices as described with reference to FIG. 1.

The time period 600 shows a time unit (e.g., slot n) that includes multiple occasions associated with semi-persistent scheduling. Although depicted as a slot in the example of FIG. 6, it may be understood that the time unit may include, for example, any type of scheduling units for wireless communications. The example time period 600 of FIG. 6 shows three occasions associated with semi-persistent scheduling, but it is to be understood that the techniques described herein may be similarly applied across any greater or lesser number of occasions. The base station and the UE may communicate uplink and/or downlink transmissions during the slot n. In the example time period 600, the slot n includes a first occasion 605, a second occasion 610 and a third occasion 615. In some examples, the first occasion may be semi-persistently scheduled for the UE according to a first configuration, the second occasion may be semi-persistently scheduled for the UE according to a second configuration and the third occasion may be semi-persistently scheduled for the UE according to a third configuration. For example, the first occasion 605 may be semi-persistently scheduled according to Configuration 0, the second occasion 610 may be semi-persistently scheduled according to Configuration 1, and the third occasion 615 may be semi-persistently scheduled according to Configuration 2. In some cases, the first configuration, the second configuration and the third configuration are downlink semi-persistently scheduled configurations. In some cases, the first configuration, the second configuration and the third configuration are uplink semi-persistently scheduled configurations (e.g., uplink configured grants).

According to one or more aspects of the present disclosure, the UE may identify an overlap in time between at least a first occasion and a second occasion during a slot. As depicted herein, the UE may identify a first overlap between the first occasion 605 and the second occasion 610, and a second overlap between the second occasion 610 and a third occasion 615. In some cases, the first occasion 605 may be associated with a first priority level, the second occasion 610 may be associated with a second priority level, and the third occasion 615 may be associated with a third priority level. In the example of FIG. 6, the third priority level may be higher than the first priority level and the second priority level. In some examples, the UE may apply a conflict resolution rule to the overlapped occasions based on identifying the overlap between the first occasion 605, the second occasion 610, and the third occasion 615. In some examples, the conflict resolution rule may configure the UE to ignore one or more low priority occasions, where the occasions ends less than a threshold number (e.g., Nx) of symbols prior to the start of at least one high priority occasion. In some cases, the UE may be configured to communicate within the slot (such as slot n) based on applying the conflict resolution rule. As depicted herein, the UE may determine to refrain from communicating using the second occasion 610 based on the conflict resolution rule and the third priority level (e.g., the priority level associated with the third occasion 615) being higher than the first priority level (e.g., the priority level associated with the first occasion 605) and the second priority level (e.g., the priority level associated with the second occasion 610). For example, the UE may determine that although the third priority level (e.g., the priority level associated with the third occasion 615) is higher than the first priority level (e.g., the priority level associated with the first occasion 605, the first occasion 605 ends more than a threshold number of symbols prior to the start of third occasion 615. In some examples, the threshold number of symbols may be based on a UE capability for a subcarrier spacing for the slot (e.g., a multiple of a symbol that is based on the subcarrier spacing). Thus, the UE may communicate in the slot n using the first occasion 605 and the third occasion 615, and may refrain from communicating in the slot using the second occasion 610 based on applying the conflict resolution rule. In some instances, the UE may further determine an overlap between multiple high priority occasions (not shown). In such a case, the UE may apply the conflict resolution rules described with reference to FIG. 2 or 3, to resolve the overlap between occasions associated with the same priority (e.g., both high priority).

Figure 7:
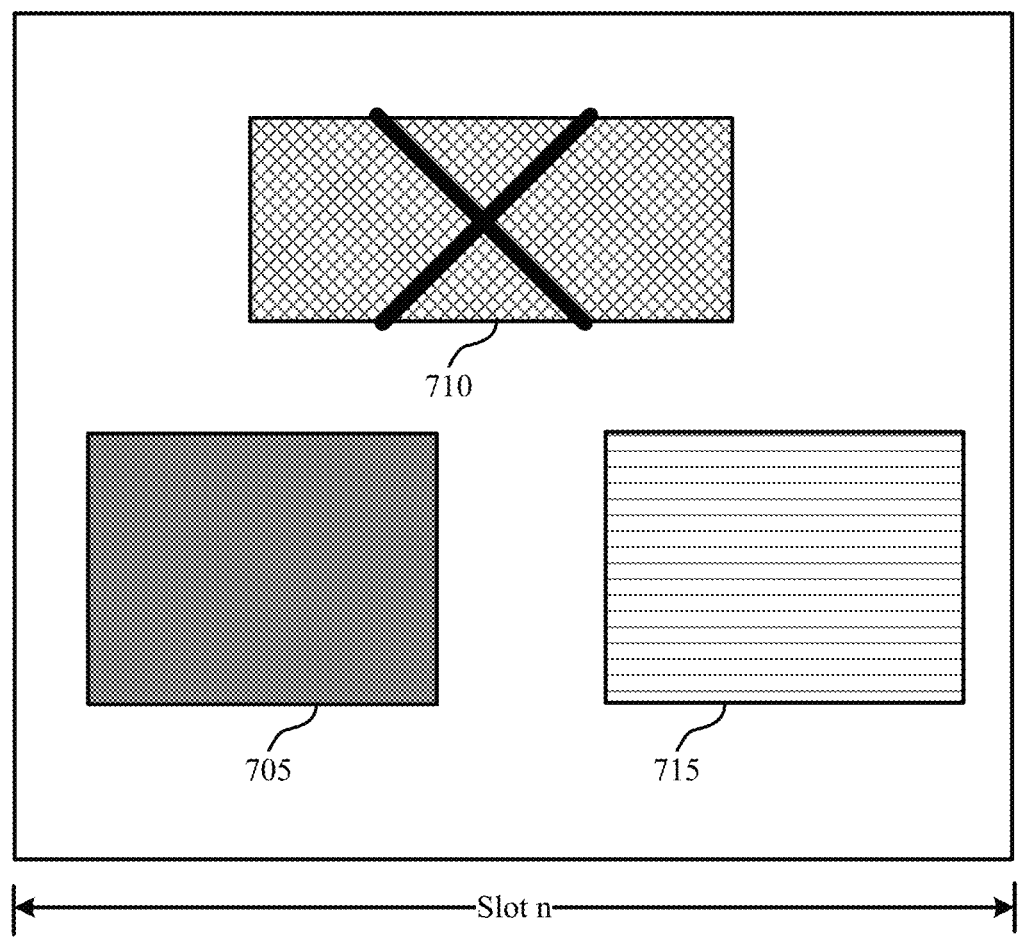
FIG. 7 illustrates an example of a time period that supports multiple configurations with overlapping occasions in accordance with aspects of the present disclosure.

FIG. 7 illustrates an example of a time period 700 that supports multiple configurations with overlapping occasions in accordance with aspects of the present disclosure. In some examples, the time period 700 may implement aspects of the wireless communications system 100 as described with reference to FIG. 1 and the wireless communications system 200 as described with reference to FIG. 2. The time period 700 may be an example of a slot n. In the example of FIG. 7, the time period 700 illustrates procedures for communicating according to a conflict resolution rule to facilitate multiple semi-persistent scheduling occasions scheduled by a base station for a UE, which may be examples of the corresponding devices as described with reference to FIG. 1.

The time period 700 shows a time unit (e.g., slot n) that includes multiple occasions associated with semi-persistent scheduling. Although depicted as a slot in the example of FIG. 7, it may be understood that the time unit may include, for example, any type of scheduling units for wireless communications. The example time period 700 of FIG. 7 shows three occasions associated with semi-persistent scheduling, but it is to be understood that the techniques described herein may be similarly applied across any greater or lesser number of occasions. For example, the slot n includes a first occasion 705, a second occasion 710, and a third occasion 715. In some examples, the first occasion 705 may be semi-persistently scheduled for the UE according to a first configuration (Configuration 0), the second occasion 710 may be semi-persistently scheduled for the UE according to a second configuration (Configuration 1) and the third occasion 715 may be semi-persistently scheduled for the UE according to a third configuration (Configuration 2). In some cases, the first configuration, the second configuration and the third configuration are downlink or uplink semi-persistently scheduled configurations.

According to one or more aspects of the present disclosure, the UE may identify an overlap in time between at least the first occasion 705 and the second occasion 710. Additionally, the UE may identify an overlap between the second occasion 710 and the third occasion 715. In some examples, each occasion may also be associated with a priority level (such as, a priority level associated with the data traffic scheduled during the occasion). In the example of FIG. 7, the first occasion 705 is associated with a first priority level, the second occasion 710 is associated with a second priority level, and the third occasion 715 is associated with a third priority level. In this example, the first priority level may be same as the second priority level, and the third priority level may be greater than the first priority level. In some cases, upon identifying the overlap in time between the occasions (such as, the first occasion 705, the second occasion 710, and the third occasion 715), the UE may apply a conflict resolution rule to the overlapped occasions. For instance, the UE may determine that the first occasion 705 ends before the end of the second occasion 710, and may communicate using the first occasion 705 based on the determining. In some cases, the UE may determine whether one or more remaining occasions (e.g., third occasion 715) overlap with the first occasions 705. If the UE determines an overlap (not shown herein), the UE may communicate using the occasion associated with a higher priority. For instance, if the UE determined an overlap between the first occasion 705 and the third occasion 715, the UE may communicate using the third occasion 715 and refrain from communicating using the first occasion 705 (as the third priority is greater than the first priority). That is, the conflict resolution rule may configure the UE to first resolve the overlapping occasions of the same priority level, and if overlapping occasions across different priorities exist, then the UE may refrain from communicating using the lower priority occasion.

Figure 8:
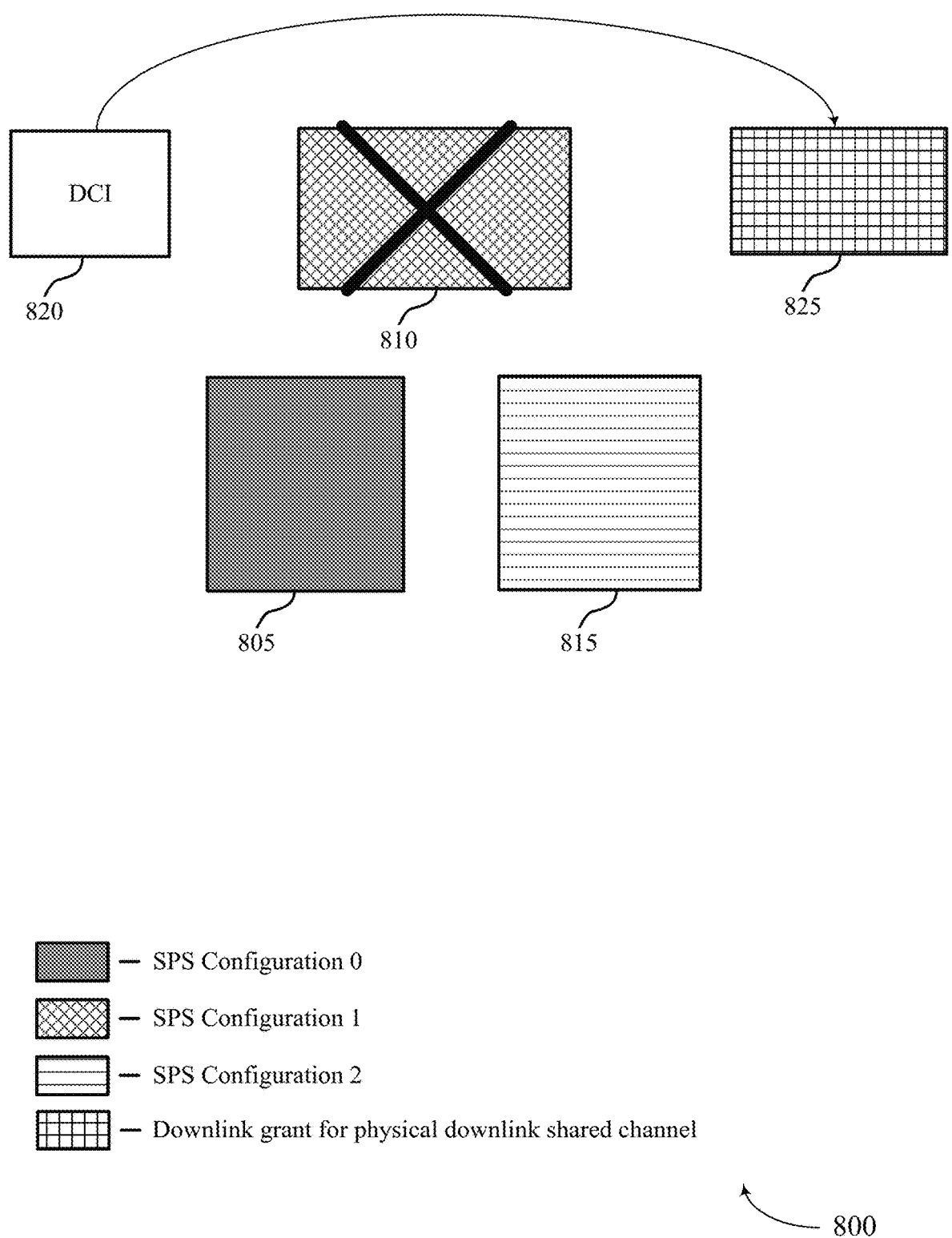
FIG. 8 illustrates an example of a timeline that supports multiple configurations with overlapping occasions in accordance with aspects of the present disclosure.

FIG. 8 illustrates an example of a timeline 800 that supports multiple configurations with overlapping occasions in accordance with aspects of the present disclosure. In some examples, the timeline 800 may implement aspects of the wireless communications system 100 as described with reference to FIG. 1 and the wireless communications system 200 as described with reference to FIG. 2. In the example of FIG. 8, the timeline 800 illustrates procedures for communicating according to a conflict resolution rule to facilitate multiple semi-persistent scheduling occasions scheduled by a base station for a UE, which may be examples of the corresponding devices as described with reference to FIG. 1.

Although the timeline 800 shows three occasions associated with semi-persistent scheduling, it is to be understood that the techniques described herein may be similarly applied across any greater or lesser number of occasions. In the example of FIG. 8, the timeline 800 includes a downlink control information 820, a first occasion 805, a second occasion 810, a third occasion 815, and an occasion 825 (such as a physical downlink shared channel occasion) indicated in the downlink control information 820. In some cases, the first occasion 805 may be semi-persistently scheduled for the UE according to a first configuration (Configuration 0), the second occasion 810 may be semi-persistently scheduled for the UE according to a second configuration (Configuration 1) and the third occasion 815 may be semi-persistently scheduled for the UE according to a third configuration (Configuration 2). In some examples, the UE may receive the downlink control information 820 indicating the occasion 825 in a slot for the UE to use to communicate according to a first priority level.

According to one or more aspects of the present disclosure, the UE may identify an overlap in time between at least the occasion 825 (such as a physical downlink shared channel occasion) indicated in the downlink control information 820 and the second occasion 810 in the slot. As previously discussed, the second occasion 810 may be semi-persistently scheduled for the UE according to a configuration associated with a second priority level. In some cases, each of the occasions may be associated with a priority level. Upon identifying the overlap, the UE may apply a conflict resolution rule to the overlapped occasions. For instance, the conflict resolution rule may indicate that the UE may not expect a dynamic physical downlink shared channel with a low priority to overwrite or overlap in time with, a semi-persistently scheduled occasion with a higher priority in a given cell. In the example of FIG. 8, the UE may determine that the conflict resolution rule indicates that the UE does not expect the occasion 825 indicated by the downlink control information 820 to have a lower priority than the second occasion 810.

According to one or more aspects of the present disclosure, the UE may determine that the priority level associated with the occasion 825 and the second priority level associated with the second occasion 810 are a same priority level. In such an example, the UE may determine to refrain from communicating in the slot using the second occasion based on the conflict resolution rule and the priority level associated with the occasion 825 and the second priority level associated with the second occasion 810 being the same priority level. In the example of FIG. 8, the UE may refrain from communicating using the second occasion 810, and may communicate using the first occasion 805 and the third occasion 815. Additionally or alternatively, the UE may determine that the priority level associated with the occasion 825 is higher than the second priority level associated with the second occasion 810. In such an example, the UE may determine to refrain from communicating in the slot using the second occasion based on the conflict resolution rule and the priority level associated with the occasion 825 being higher than the second priority level associated with the second occasion 810. In some examples, if another occasion of the same priority as or of a lower priority than the occasion 825 overlaps with the occasion 825 indicated in the downlink control information 820, then the UE may refrain from communicating in the slot using the third occasion. Additionally or alternatively, for other overlapping semi-persistently scheduled occasions, the UE may be configured to resolve the overlapping using the conflict resolution rules described with reference to FIGS. 3 through 7.

Figure 9:
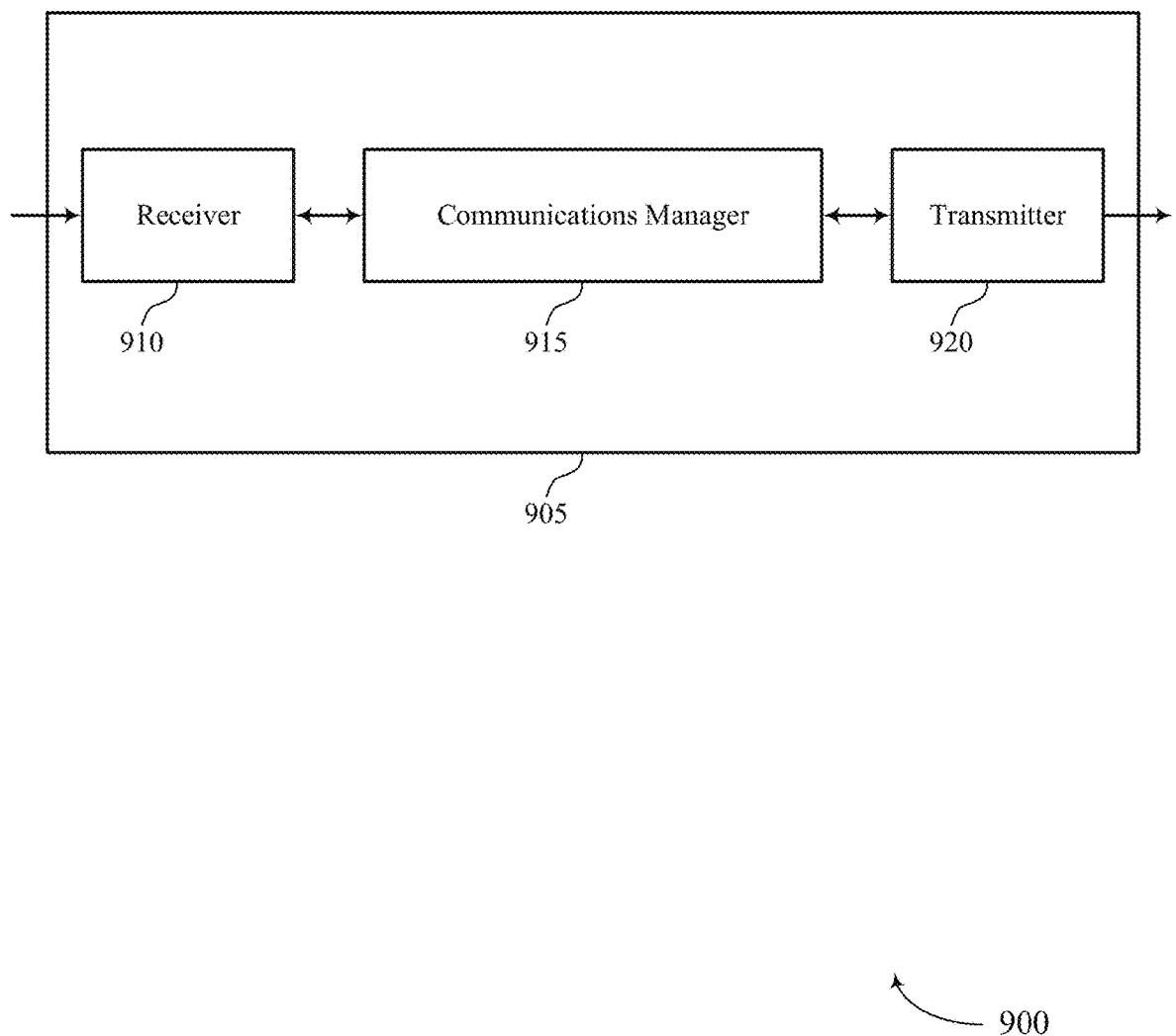
FIGS. 9 and 10 show block diagrams of devices that support multiple configurations with overlapping occasions in accordance with aspects of the present disclosure.

FIG. 9 shows a block diagram 900 of a device 905 that supports multiple configurations with overlapping occasions in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multiple configurations with overlapping occasions, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level, apply, based on the identified overlap, a conflict resolution rule to the first occasion and the second occasion based on the first priority level for the first occasion and the second priority level for the second occasion, communicate in the slot using the first occasion based on applying the conflict resolution rule, and refrain from communicating in the slot using the second occasion based on applying the conflict resolution rule. The communications manager 915 may also receive downlink control information indicating a first occasion in a slot for the UE to use to communicate according to a first priority level, identify an overlap in time between at least the first occasion and a second occasion in the slot, the second occasion semi-persistently scheduled for the UE according to a configuration associated with a second priority level, apply, based on the identified overlap, a conflict resolution rule to the identified overlap based on the first priority level for the first occasion and the second priority level for the second occasion, communicate in the slot using the first occasion based on applying the conflict resolution rule, and refrain from communicating in the slot using the second occasion based on applying the conflict resolution rule. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
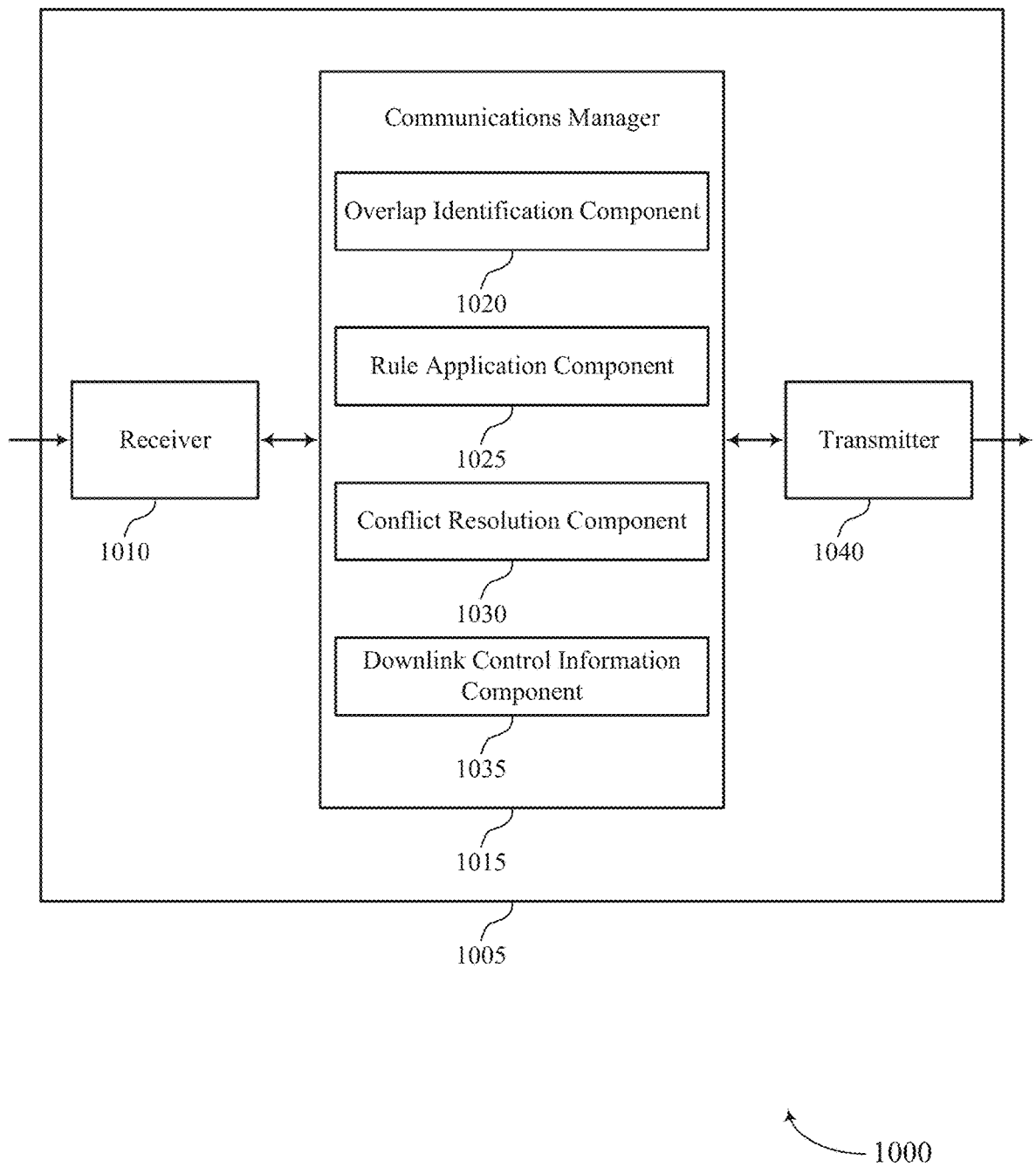

FIG. 10 shows a block diagram 1000 of a device 1005 that supports multiple configurations with overlapping occasions in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to multiple configurations with overlapping occasions, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an overlap identification component 1020, a rule application component 1025, a conflict resolution component 1030, and a downlink control information component 1035. The communications manager 1015 may be an example of aspects of the communications manager 1210 described herein.

The overlap identification component 1020 may identify an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level. The rule application component 1025 may apply, based on the identified overlap, a conflict resolution rule to the first occasion and the second occasion based on the first priority level for the first occasion and the second priority level for the second occasion. The conflict resolution component 1030 may communicate in the slot using the first occasion based on applying the conflict resolution rule and refrain from communicating in the slot using the second occasion based on applying the conflict resolution rule.

The downlink control information component 1035 may receive downlink control information indicating a first occasion in a slot for the UE to use to communicate according to a first priority level. The overlap identification component 1020 may identify an overlap in time between at least the first occasion and a second occasion in the slot, the second occasion semi-persistently scheduled for the UE according to a configuration associated with a second priority level. The rule application component 1025 may apply, based on the identified overlap, a conflict resolution rule to the identified overlap based on the first priority level for the first occasion and the second priority level for the second occasion. The conflict resolution component 1030 may communicate in the slot using the first occasion based on applying the conflict resolution rule and refrain from communicating in the slot using the second occasion based on applying the conflict resolution rule.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
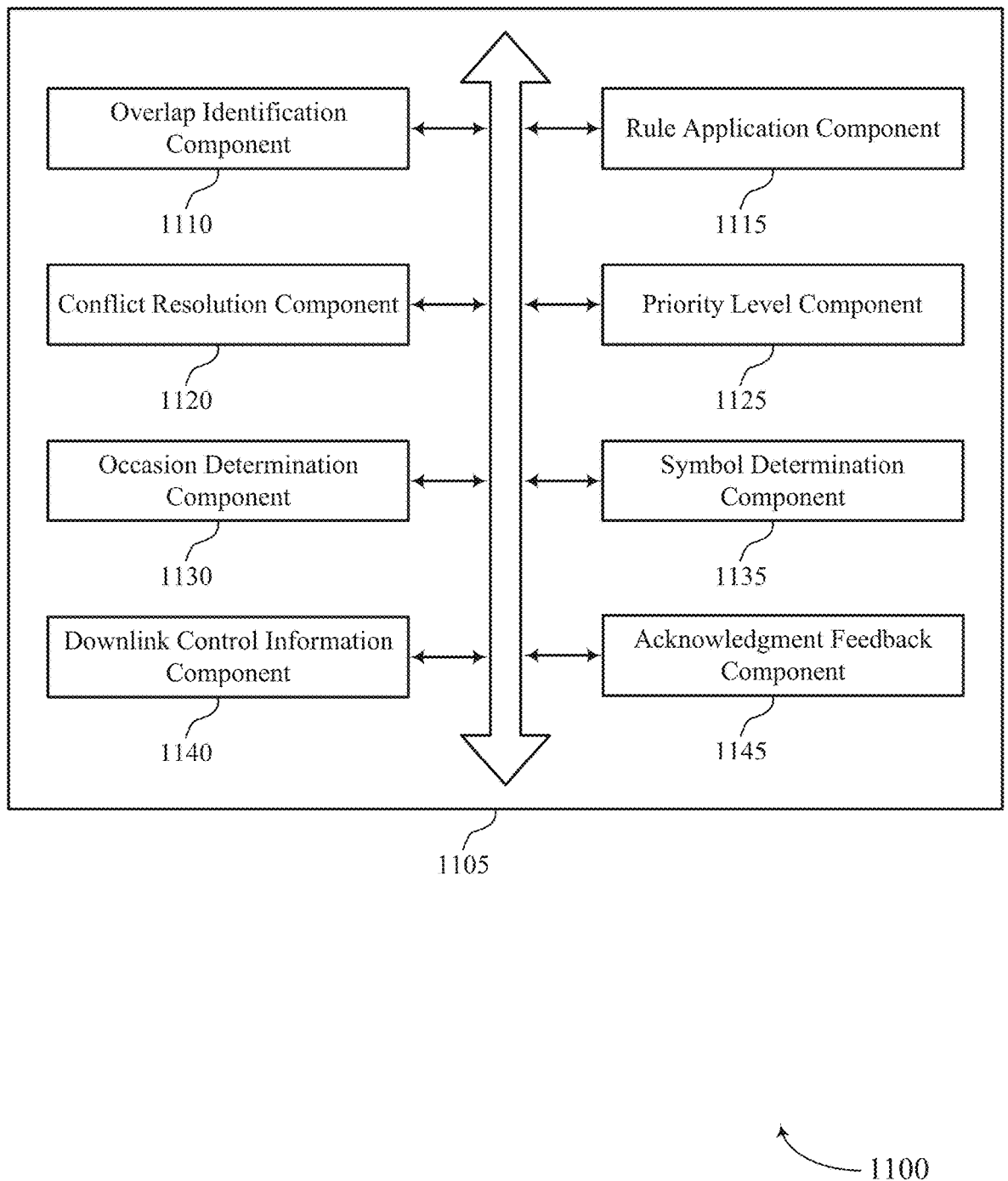
FIG. 11 shows a block diagram of a communications manager that supports multiple configurations with overlapping occasions in accordance with aspects of the present disclosure.

FIG. 11 shows a block diagram 1100 of a communications manager 1105 that supports multiple configurations with overlapping occasions in accordance with aspects of the present disclosure. The communications manager 1105 may be an example of aspects of a communications manager 915, a communications manager 1015, or a communications manager 1210 described herein. The communications manager 1105 may include an overlap identification component 1110, a rule application component 1115, a conflict resolution component 1120, a priority level component 1125, an occasion determination component 1130, a symbol determination component 1135, and a downlink control information component 1140. Each of these modules may communicate, directly or indirectly, with one another (e.g., via one or more buses).

The overlap identification component 1110 may identify an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level. In some cases, the first configuration and the second configuration are downlink semi-persistently scheduled configurations. In some cases, the first configuration and the second configuration are uplink configured grant configurations. The rule application component 1115 may apply, based on the identified overlap, a conflict resolution rule to the first occasion and the second occasion based on the first priority level for the first occasion and the second priority level for the second occasion. The conflict resolution component 1120 may communicate in the slot using the first occasion based on applying the conflict resolution rule. In some examples, the conflict resolution component 1120 may refrain from communicating in the slot using the second occasion based on applying the conflict resolution rule.

The priority level component 1125 may identify that the first priority level and the second priority level are a same priority level. The occasion determination component 1130 may determine that the first occasion ends before the second occasion ends, where the UE refrains from communicating in the slot using the second occasion based on the determining and the identified overlap. The occasion determination component 1130 may determine that a first index value for the first occasion is greater than a second index value for the second occasion, where the UE communicates in the slot using the first occasion based on the determining, and where the UE refrains from communicating in the slot using the second occasion based on the determining. In other examples, the occasion determination component 1130 may determine that a first index value for the first occasion is smaller than a second index value for the second occasion, where the UE communicates in the slot using the first occasion based on the determining, and where the UE refrains from communicating in the slot using the second occasion based on the determining.

Additionally or alternatively, the occasion determination component 1130 may identify a first number of occasions of a shared channel that the UE is capable of receiving in the slot, and determine, based at least in part on the identified first number of occasions, a maximum number of occasions semi-persistently scheduled for the UE in the slot. In some examples, the slot includes a plurality of occasions semi-persistently scheduled for the UE, including the first occasion and the second occasion, and the occasion determination component 1130, may apply the conflict resolution rule to the plurality of occasions semi-persistently scheduled for the UE, determine, based at least in part on the applying the conflict resolution rule, a subset of occasions of the plurality of occasions, the subset including at least the first occasion, determine that a second number of the subset of occasions exceeds the maximum number of occasions, and communicate in the slot using the maximum number of occasions of the subset of occasions based at least in part on the comparing. Each occasion of the subset of occasions may be associated with an index value, and the maximum number of occasions of the subset of occasions may correspond to a lowest set of index values. In some examples, the slot includes a plurality of occasions semi-persistently scheduled for the UE, including the first occasion and the second occasion, and the occasion determination component 1130, may identify one or more remaining occasions of the subset of occasions based on the maximum number of occasions, and refrain from communicating in the slot using the one or more remaining occasions.

In some examples, the overlap identification component 1110 may identify an overlap in time between at least the first occasion and a second occasion in the slot, the second occasion semi-persistently scheduled for the UE according to a configuration associated with a second priority level. In some examples, the priority level component 1125 may identify that the first priority level is higher than the third priority level. In some examples, the conflict resolution component 1120 may refrain from communicating in the slot using the third occasion based on the conflict resolution rule and the first priority level being higher than the third priority level.

In some examples, the overlap identification component 1110 may identify an overlap in time between the second occasion and a third occasion in the slot, the third occasion semi-persistently scheduled for the UE according to a third configuration associated with a third priority level. In some examples, the conflict resolution component 1120 may communicate in the slot using the third occasion based on the UE refraining from communicating in the slot using the second occasion. In some cases, the first priority level is higher than the third priority level.

In some examples, the priority level component 1125 may identify that the first priority level is higher than the second priority level. In some examples, the rule application component 1115 may determine to refrain from communicating using occasions in the slot, including the second occasion, associated with the second priority level based on the conflict resolution rule and the first priority level being higher than the second priority level.

In some examples, the rule application component 1115 may determine to refrain from communicating using occasions in the slot, including the second occasion, associated with the second priority level that ends within a threshold number of symbols of the start of first occasion based on the conflict resolution rule and the first priority level being higher than the second priority level. The symbol determination component 1135 may determine, by the UE, the threshold number of symbols based on a UE capability for a subcarrier spacing for the slot.

The downlink control information component 1140 may receive downlink control information indicating a first occasion in a slot for the UE to use to communicate according to a first priority level. In some cases, the received downlink control information includes a downlink grant of resources for the UE indicating the first occasion, and the configuration is a downlink semi-persistently scheduled configuration. In some cases, the received downlink control information includes an uplink grant of resources for the UE indicating the first occasion, and the configuration is an uplink semi-persistently scheduled configuration.

In some examples, the acknowledgment feedback component may refrain (or control the communications manager 1105, another component of communications manager 1105, a UE 115, or another component of UE 115, to refrain) from providing acknowledgement feedback for occasions semi-persistently scheduled for the UE for which the UE has not received a corresponding data channel signal.

In some examples, the overlap identification component 1110 may identify an overlap in time between the first occasion and a third occasion in the slot, the third occasion semi-persistently scheduled for the UE according to a third configuration associated with a third priority level. In some examples, the rule application component 1115 may apply, based on the identified overlap, a conflict resolution rule to the identified overlap based on the first priority level for the first occasion and the second priority level for the second occasion. In some examples, the conflict resolution component 1120 may communicate in the slot using the first occasion based on applying the conflict resolution rule. In some examples, the conflict resolution component 1120 may refrain from communicating in the slot using the second occasion based on applying the conflict resolution rule.

In some cases, the conflict resolution rule indicates that the UE does not expect the first occasion in the slot to have a lower priority than the second occasion in the slot based on the overlap in time, the first occasion being indicated by downlink control information, and the second occasion being semi-persistently scheduled.

In some examples, the priority level component 1125 may identify that the first priority level and the second priority level are a same priority level. In some examples, the rule application component 1115 may determine to refrain from communicating in the slot using the second occasion based on the conflict resolution rule and the first priority level and the second priority level being the same priority level.

In some examples, the priority level component 1125 may identify that the first priority level is higher than the second priority level. In some examples, the rule application component 1115 may determine to refrain from communicating in the slot using the second occasion based on the conflict resolution rule and the first priority level being higher than the second priority level.

In some examples, the overlap identification component 1110 may identify an overlap in time between the first occasion and a third occasion in the slot, the third occasion semi-persistently scheduled for the UE according to a third configuration associated with a third priority level. In some examples, the priority level component 1125 may identify that the first priority level is a same priority level or higher than the third priority level. In some examples, the rule application component 1115 may refrain from communicating in the slot using the third occasion based on the conflict resolution rule and the first priority level being the same priority level or higher than the third priority level.

In some examples, the overlap identification component 1110 may identify an overlap in time between the second occasion and a third occasion in the slot, the third occasion semi-persistently scheduled for the UE according to a third configuration associated with a third priority level. In some examples, the rule application component 1115 may communicate in the slot using the third occasion based on the UE refraining from communicating in the slot using the second occasion.

Figure 12:
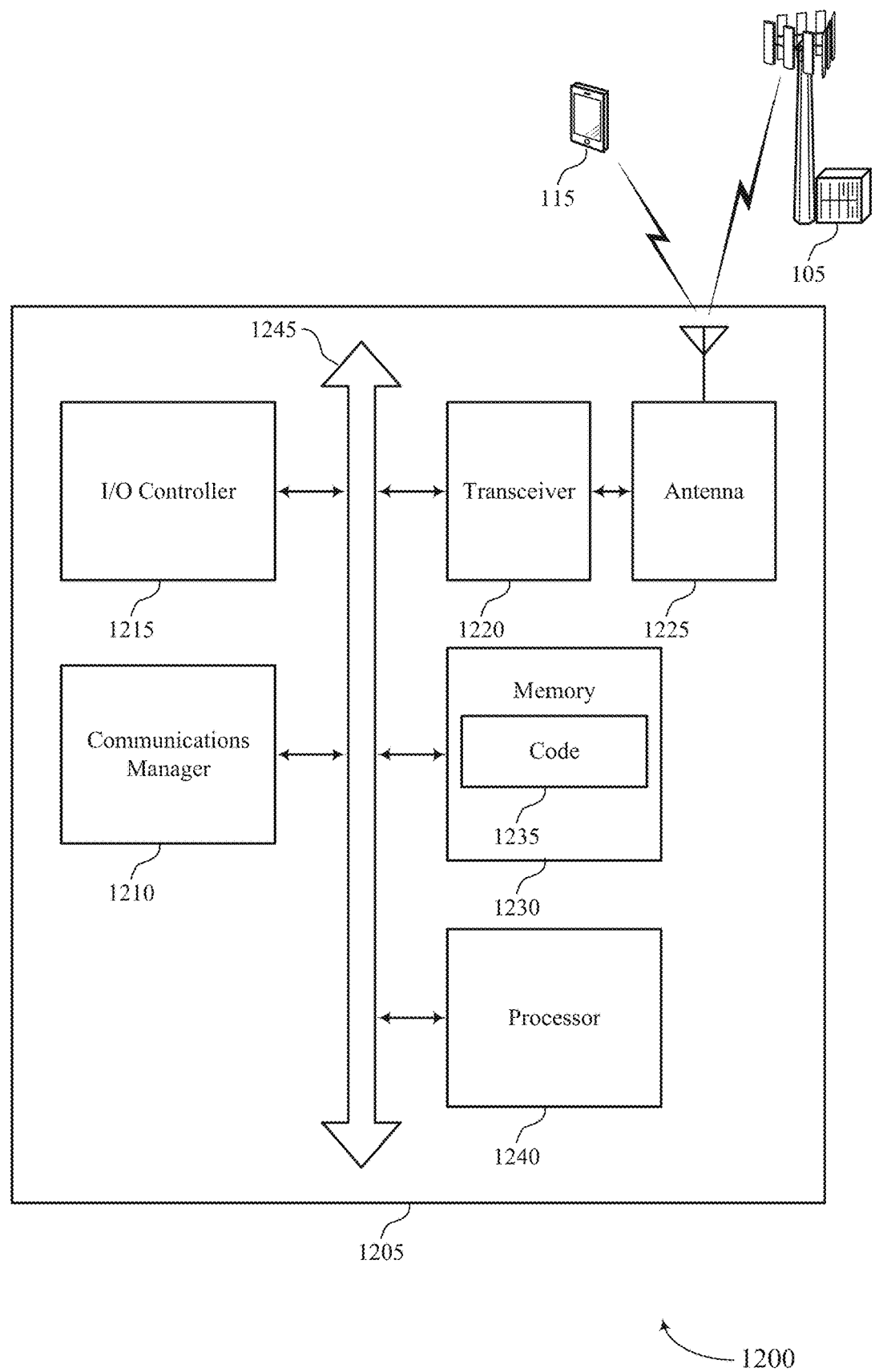
FIG. 12 shows a diagram of a system including a device that supports multiple configurations with overlapping occasions in accordance with aspects of the present disclosure.

FIG. 12 shows a diagram of a system 1200 including a device 1205 that supports multiple configurations with overlapping occasions in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level, apply, based on the identified overlap, a conflict resolution rule to the first occasion and the second occasion based on the first priority level for the first occasion and the second priority level for the second occasion, communicate in the slot using the first occasion based on applying the conflict resolution rule, and refrain from communicating in the slot using the second occasion based on applying the conflict resolution rule. The communications manager 1210 may also receive downlink control information indicating a first occasion in a slot for the UE to use to communicate according to a first priority level, identify an overlap in time between at least the first occasion and a second occasion in the slot, the second occasion semi-persistently scheduled for the UE according to a configuration associated with a second priority level, apply, based on the identified overlap, a conflict resolution rule to the identified overlap based on the first priority level for the first occasion and the second priority level for the second occasion, communicate in the slot using the first occasion based on applying the conflict resolution rule, and refrain from communicating in the slot using the second occasion based on applying the conflict resolution rule.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multiple configurations with overlapping occasions).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
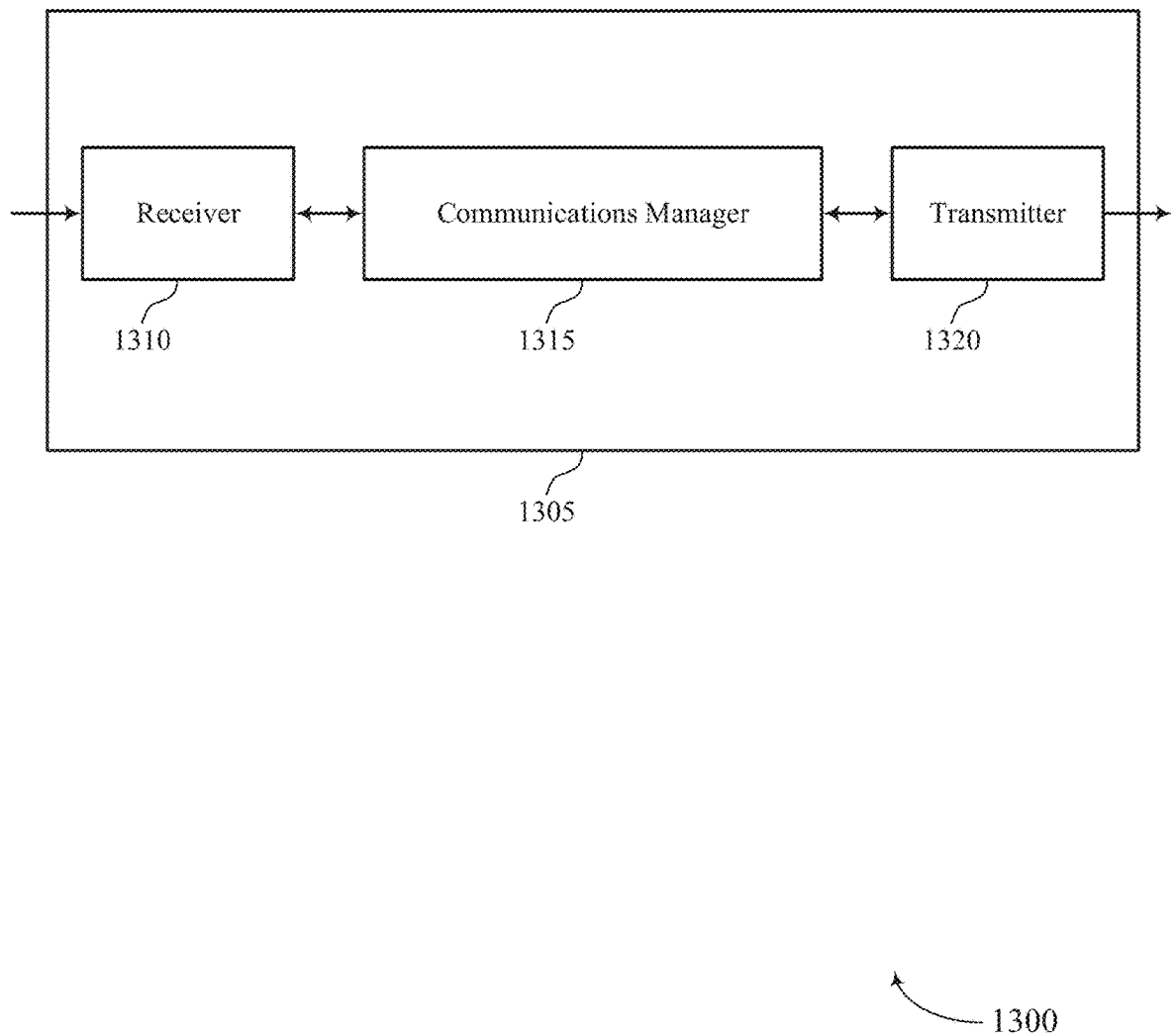
FIGS. 13 and 14 show block diagrams of devices that support multiple configurations with overlapping occasions in accordance with aspects of the present disclosure.

FIG. 13 shows a block diagram 1300 of a device 1305 that supports multiple configurations with overlapping occasions in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to multiple configurations with overlapping occasions, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level, identify that the UE will apply, based on the identified overlap, a conflict resolution rule to the first occasion and the second occasion based on the first priority level for the first occasion and the second priority level for the second occasion, communicate with the UE in the slot using the first occasion based on applying the conflict resolution rule, refrain from communicating with the UE in the slot using the second occasion based on applying the conflict resolution rule, transmit downlink control information indicating a first occasion in a slot for a UE to use to communicate according to a first priority level, identify that there will be an overlap in time between at least the first occasion and a second occasion in the slot, the second occasion semi-persistently scheduled for the UE according to a configuration associated with a second priority level, identify that the UE will apply, based on the identified overlap, a conflict resolution rule to the identified overlap based on the first priority level for the first occasion and the second priority level for the second occasion, communicate with the UE in the slot using the first occasion based on applying the conflict resolution rule, and refrain from communicating with the UE in the slot using the second occasion based on applying the conflict resolution rule. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
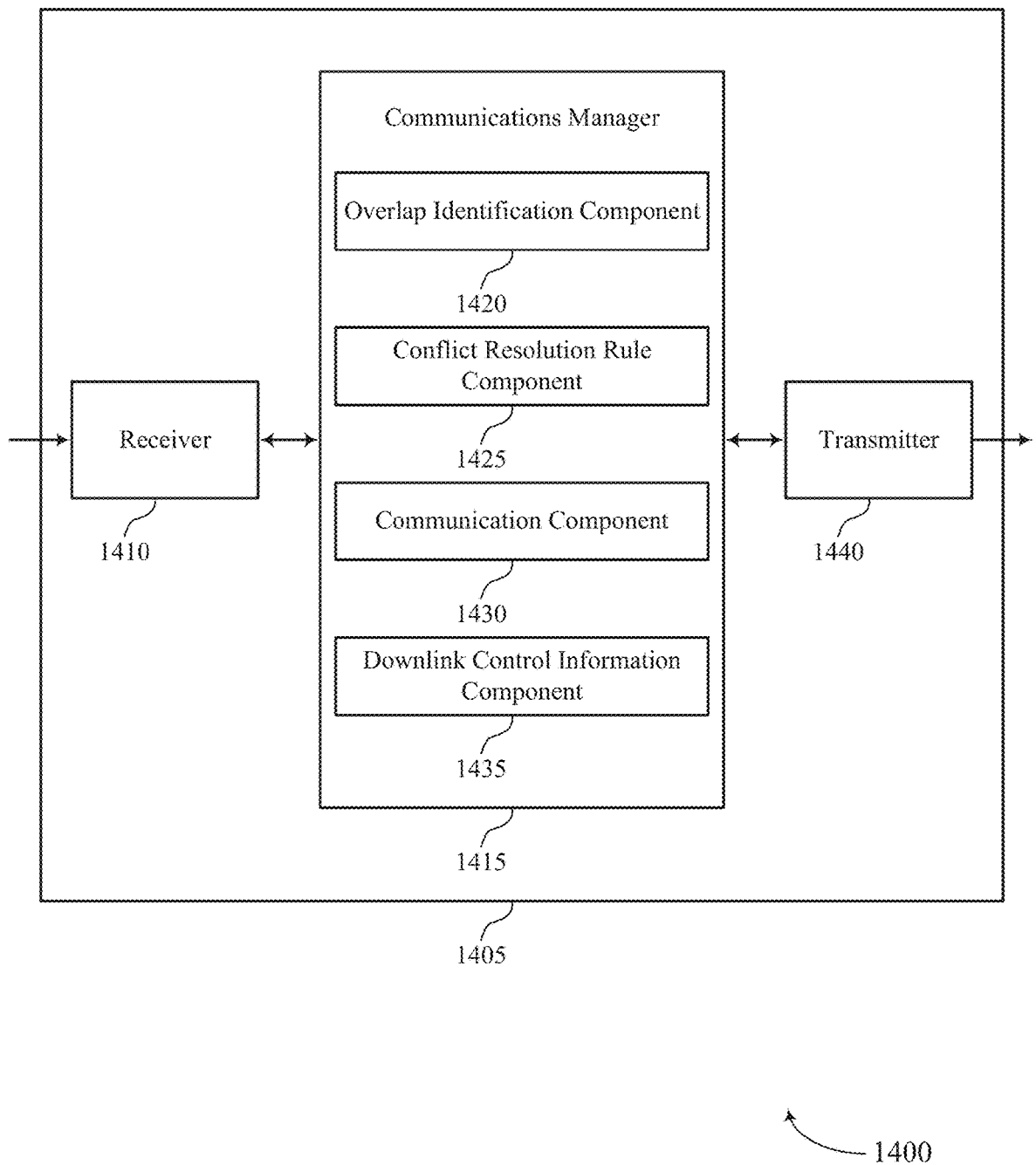

FIG. 14 shows a block diagram 1400 of a device 1405 that supports multiple configurations with overlapping occasions in accordance with aspects of the present disclosure. The device 1405 may be an example of aspects of a device 1305, or a base station 105 as described herein. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to multiple configurations with overlapping occasions, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include an overlap identification component 1420, a conflict resolution rule component 1425, a communication component 1430, and a downlink control information component 1435. The communications manager 1415 may be an example of aspects of the communications manager 1610 described herein.

The overlap identification component 1420 may identify that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level. The conflict resolution rule component 1425 may identify that the UE will apply, based on the identified overlap, a conflict resolution rule to the first occasion and the second occasion based on the first priority level for the first occasion and the second priority level for the second occasion. The communication component 1430 may communicate with the UE in the slot using the first occasion based on applying the conflict resolution rule and refrain from communicating with the UE in the slot using the second occasion based on applying the conflict resolution rule.

The downlink control information component 1435 may transmit downlink control information indicating a first occasion in a slot for a UE to use to communicate according to a first priority level. The overlap identification component 1420 may identify that there will be an overlap in time between at least the first occasion and a second occasion in the slot, the second occasion semi-persistently scheduled for the UE according to a configuration associated with a second priority level. The conflict resolution rule component 1425 may identify that the UE will apply, based on the identified overlap, a conflict resolution rule to the identified overlap based on the first priority level for the first occasion and the second priority level for the second occasion. The communication component 1430 may communicate with the UE in the slot using the first occasion based on applying the conflict resolution rule and refrain from communicating with the UE in the slot using the second occasion based on applying the conflict resolution rule.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
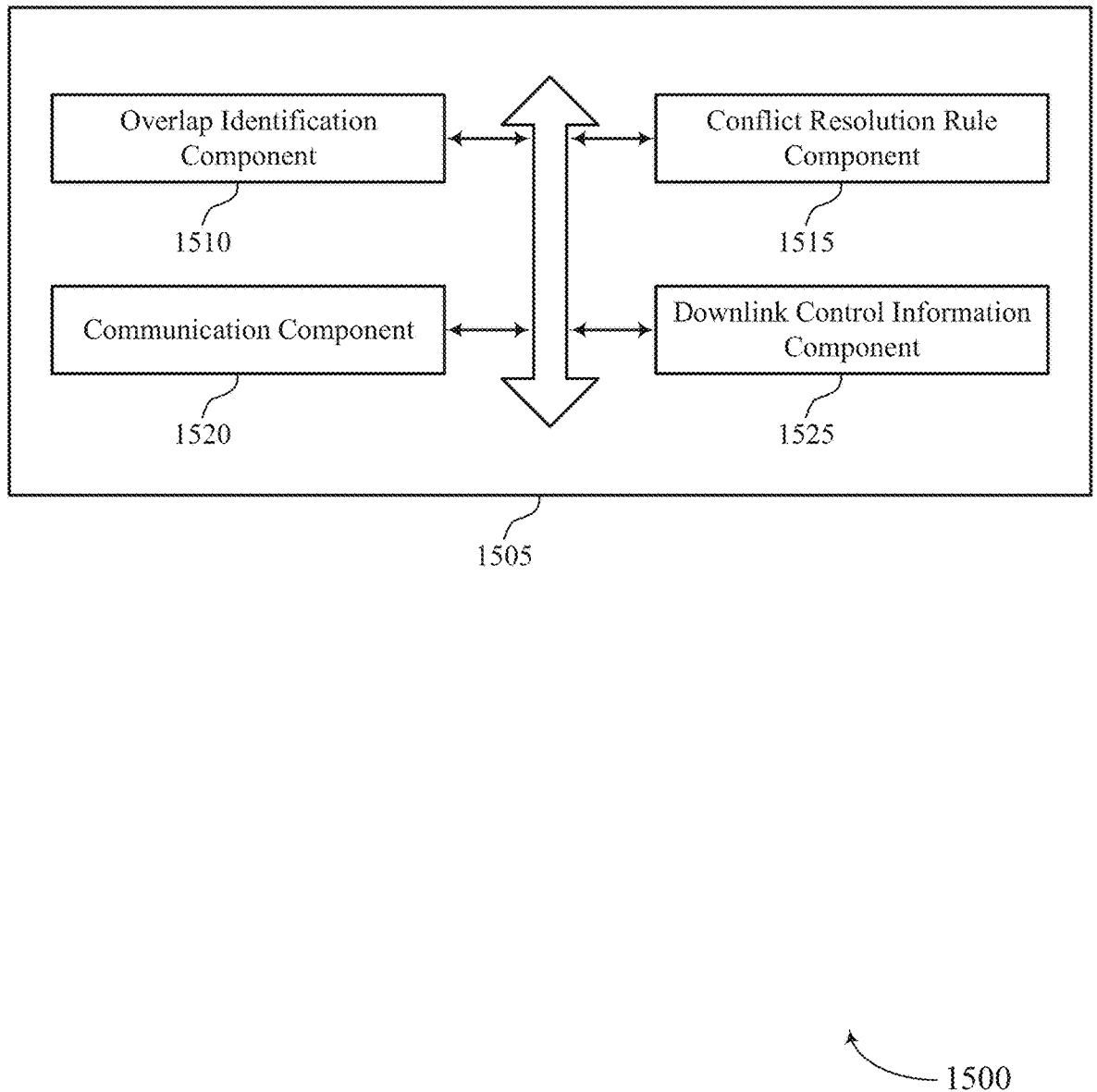
FIG. 15 shows a block diagram of a communications manager that supports multiple configurations with overlapping occasions in accordance with aspects of the present disclosure.

FIG. 15 shows a block diagram 1500 of a communications manager 1505 that supports multiple configurations with overlapping occasions in accordance with aspects of the present disclosure. The communications manager 1505 may be an example of aspects of a communications manager 1315, a communications manager 1415, or a communications manager 1610 described herein. The communications manager 1505 may include an overlap identification component 1510, a conflict resolution rule component 1515, a communication component 1520, and a downlink control information component 1525. Each of these modules may communicate, directly or indirectly, with one another (e.g., via one or more buses).

The overlap identification component 1510 may identify that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level. In some examples, the overlap identification component 1510 may identify that there will be an overlap in time between at least the first occasion and a second occasion in the slot, the second occasion semi-persistently scheduled for the UE according to a configuration associated with a second priority level.

The conflict resolution rule component 1515 may identify that the UE will apply, based on the identified overlap, a conflict resolution rule to the first occasion and the second occasion based on the first priority level for the first occasion and the second priority level for the second occasion.

In some examples, the conflict resolution rule component 1515 may identify that the UE will apply, based on the identified overlap, a conflict resolution rule to the identified overlap based on the first priority level for the first occasion and the second priority level for the second occasion. The communication component 1520 may communicate with the UE in the slot using the first occasion based on applying the conflict resolution rule. In some examples, the communication component 1520 may refrain from communicating with the UE in the slot using the second occasion based on applying the conflict resolution rule. In some examples, the communication component 1520 may communicate with the UE in the slot using the first occasion based on applying the conflict resolution rule. In some examples, the communication component 1520 may refrain from communicating with the UE in the slot using the second occasion based on applying the conflict resolution rule. The downlink control information component 1525 may transmit downlink control information indicating a first occasion in a slot for a UE to use to communicate according to a first priority level.

Figure 16:
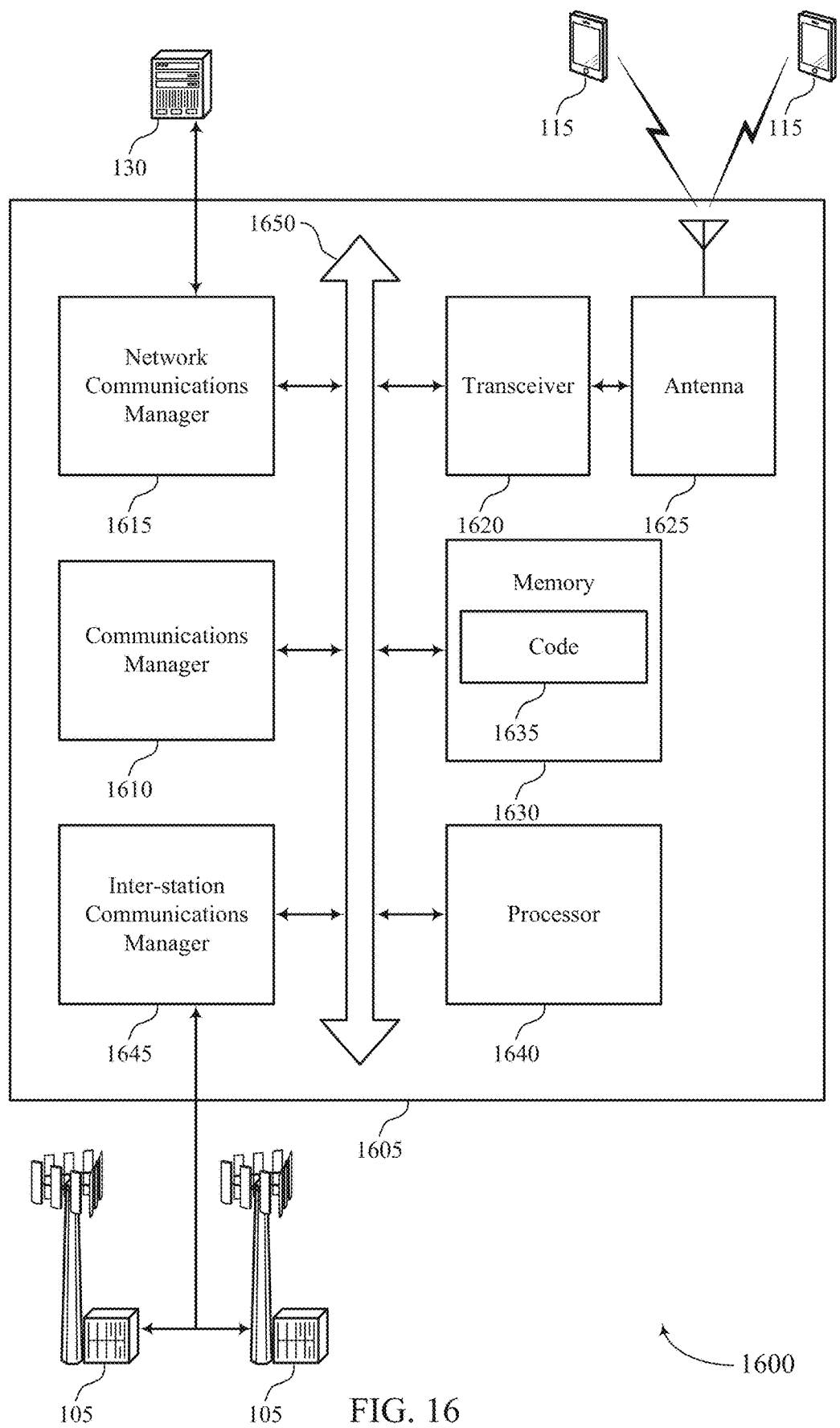
FIG. 16 shows a diagram of a system including a device that supports multiple configurations with overlapping occasions in accordance with aspects of the present disclosure.

FIG. 16 shows a diagram of a system 1600 including a device 1605 that supports multiple configurations with overlapping occasions in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level, identify that the UE will apply, based on the identified overlap, a conflict resolution rule to the first occasion and the second occasion based on the first priority level for the first occasion and the second priority level for the second occasion, communicate with the UE in the slot using the first occasion based on applying the conflict resolution rule, refrain from communicating with the UE in the slot using the second occasion based on applying the conflict resolution rule, transmit downlink control information indicating a first occasion in a slot for a UE to use to communicate according to a first priority level, identify that there will be an overlap in time between at least the first occasion and a second occasion in the slot, the second occasion semi-persistently scheduled for the UE according to a configuration associated with a second priority level, identify that the UE will apply, based on the identified overlap, a conflict resolution rule to the identified overlap based on the first priority level for the first occasion and the second priority level for the second occasion, communicate with the UE in the slot using the first occasion based on applying the conflict resolution rule, and refrain from communicating with the UE in the slot using the second occasion based on applying the conflict resolution rule.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or any combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting multiple configurations with overlapping occasions).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
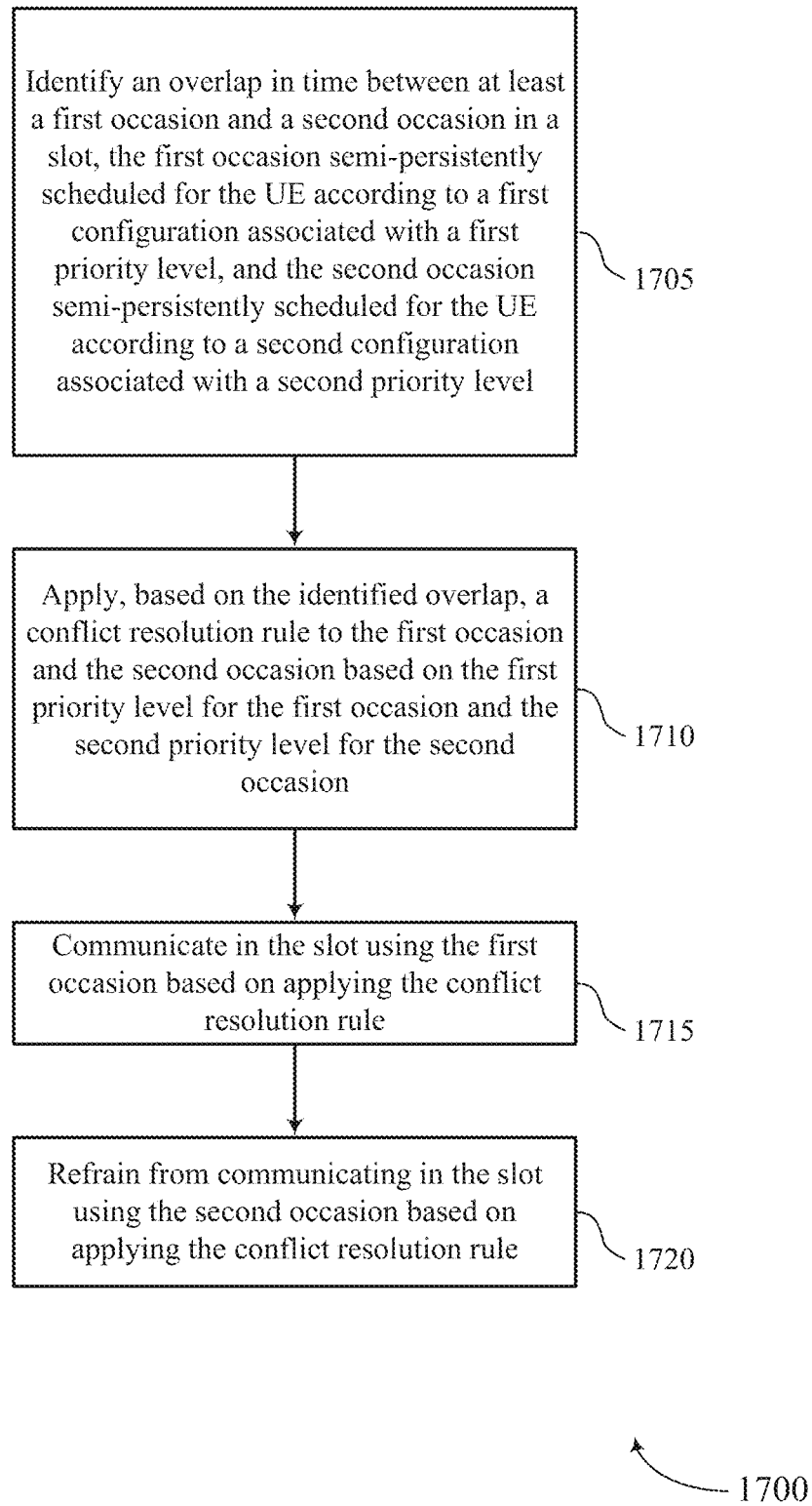
FIGS. 17 through 20 show flowcharts illustrating methods that support multiple configurations with overlapping occasions in accordance with aspects of the present disclosure.

FIG. 17 shows a flowchart illustrating a method 1700 that supports multiple configurations with overlapping occasions in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may identify an overlap in time between at least a first occasion and a second occasion in a slot, the first occasion semi-persistently scheduled for the UE according to a first configuration associated with a first priority level, and the second occasion semi-persistently scheduled for the UE according to a second configuration associated with a second priority level. The operations of 1705 may be performed according to the methods described herein. In some examples, aspects of the operations of 1705 may be performed by an overlap identification component as described with reference to FIGS. 9 through 12.

At 1710, the UE may apply, based on the identified overlap, a conflict resolution rule to the first occasion and the second occasion based on the first priority level for the first occasion and the second priority level for the second occasion. The operations of 1710 may be performed according to the methods described herein. In some examples, aspects of the operations of 1710 may be performed by a rule application component as described with reference to FIGS. 9 through 12.

At 1715, the UE may communicate in the slot using the first occasion based on applying the conflict resolution rule. The operations of 1715 may be performed according to the methods described herein. In some examples, aspects of the operations of 1715 may be performed by a conflict resolution component as described with reference to FIGS. 9 through 12.

At 1720, the UE may refrain from communicating in the slot using the second occasion based on applying the conflict resolution rule. The operations of 1720 may be performed according to the methods described herein. In some examples, aspects of the operations of 1720 may be performed by a conflict resolution component as described with reference to FIGS. 9 through 12.

Figure 18:
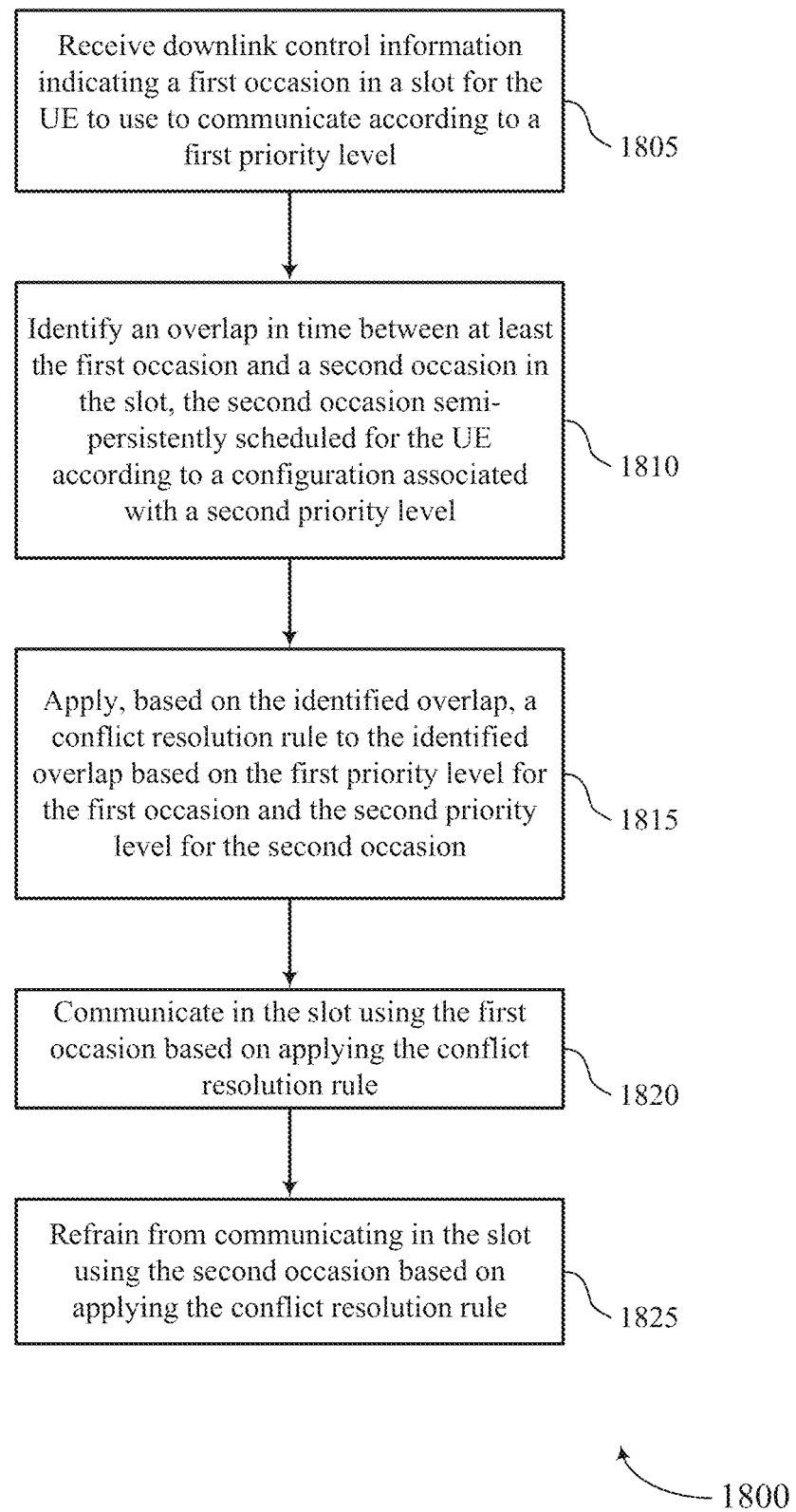

FIG. 18 shows a flowchart illustrating a method 1800 that supports multiple configurations with overlapping occasions in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive downlink control information indicating a first occasion in a slot for the UE to use to communicate according to a first priority level. The operations of 1805 may be performed according to the methods described herein. In some examples, aspects of the operations of 1805 may be performed by a downlink control information component as described with reference to FIGS. 9 through 12.

At 1810, the UE may identify an overlap in time between at least the first occasion and a second occasion in the slot, the second occasion semi-persistently scheduled for the UE according to a configuration associated with a second priority level. The operations of 1810 may be performed according to the methods described herein. In some examples, aspects of the operations of 1810 may be performed by an overlap identification component as described with reference to FIGS. 9 through 12.

At 1815, the UE may apply, based on the identified overlap, a conflict resolution rule to the identified overlap based on the first priority level for the first occasion and the second priority level for the second occasion. The operations of 1815 may be performed according to the methods described herein. In some examples, aspects of the operations of 1815 may be performed by a rule application component as described with reference to FIGS. 9 through 12.

At 1820, the UE may communicate in the slot using the first occasion based on applying the conflict resolution rule. The operations of 1820 may be performed according to the methods described herein. In some examples, aspects of the operations of 1820 may be performed by a conflict resolution component as described with reference to FIGS. 9 through 12.

At 1825, the UE may refrain from communicating in the slot using the second occasion based on applying the conflict resolution rule. The operations of 1825 may be performed according to the methods described herein. In some examples, aspects of the operations of 1825 may be performed by a conflict resolution component as described with reference to FIGS. 9 through 12.

Figure 19:
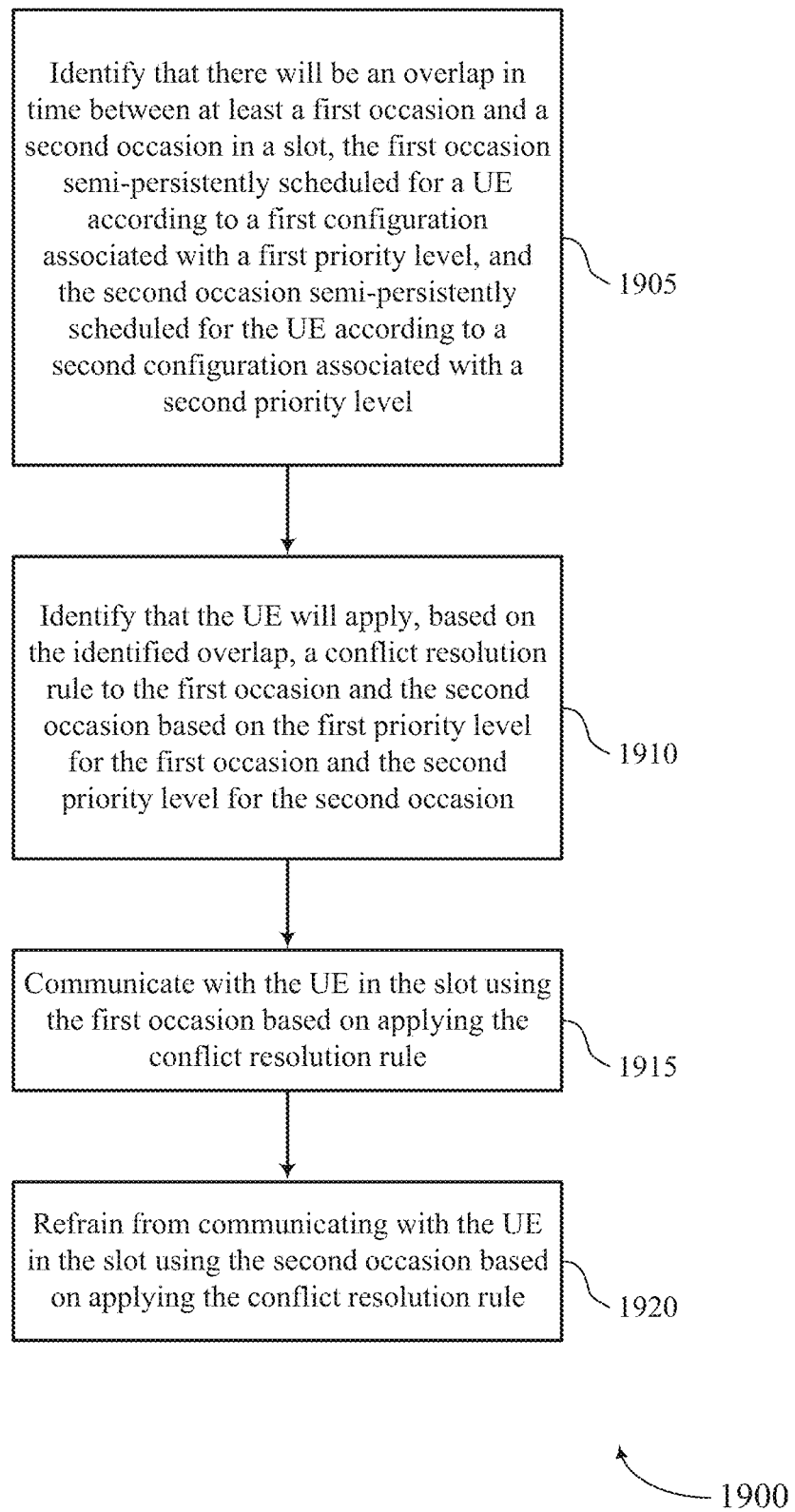

FIG. 19 shows a flowchart illustrating a method 1900 that supports multiple configurations with overlapping occasions in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1905, the base station may identify that there will be an overlap in time between at least a first occasion and a second occasion in a slot, the first occasion semi-persistently scheduled for a UE according to a first configuration associated with a first priority level, and the second occasion semi-persistently scheduled for the UE according to a second configuration associated with a second priority level. The operations of 1905 may be performed according to the methods described herein. In some examples, aspects of the operations of 1905 may be performed by an overlap identification component as described with reference to FIGS. 13 through 16.

At 1910, the base station may identify that the UE will apply, based on the identified overlap, a conflict resolution rule to the first occasion and the second occasion based on the first priority level for the first occasion and the second priority level for the second occasion. The operations of 1910 may be performed according to the methods described herein. In some examples, aspects of the operations of 1910 may be performed by a conflict resolution rule component as described with reference to FIGS. 13 through 16.

At 1915, the base station may communicate with the UE in the slot using the first occasion based on applying the conflict resolution rule. The operations of 1915 may be performed according to the methods described herein. In some examples, aspects of the operations of 1915 may be performed by a communication component as described with reference to FIGS. 13 through 16.

At 1920, the base station may refrain from communicating with the UE in the slot using the second occasion based on applying the conflict resolution rule. The operations of 1920 may be performed according to the methods described herein. In some examples, aspects of the operations of 1920 may be performed by a communication component as described with reference to FIGS. 13 through 16.

Figure 20:
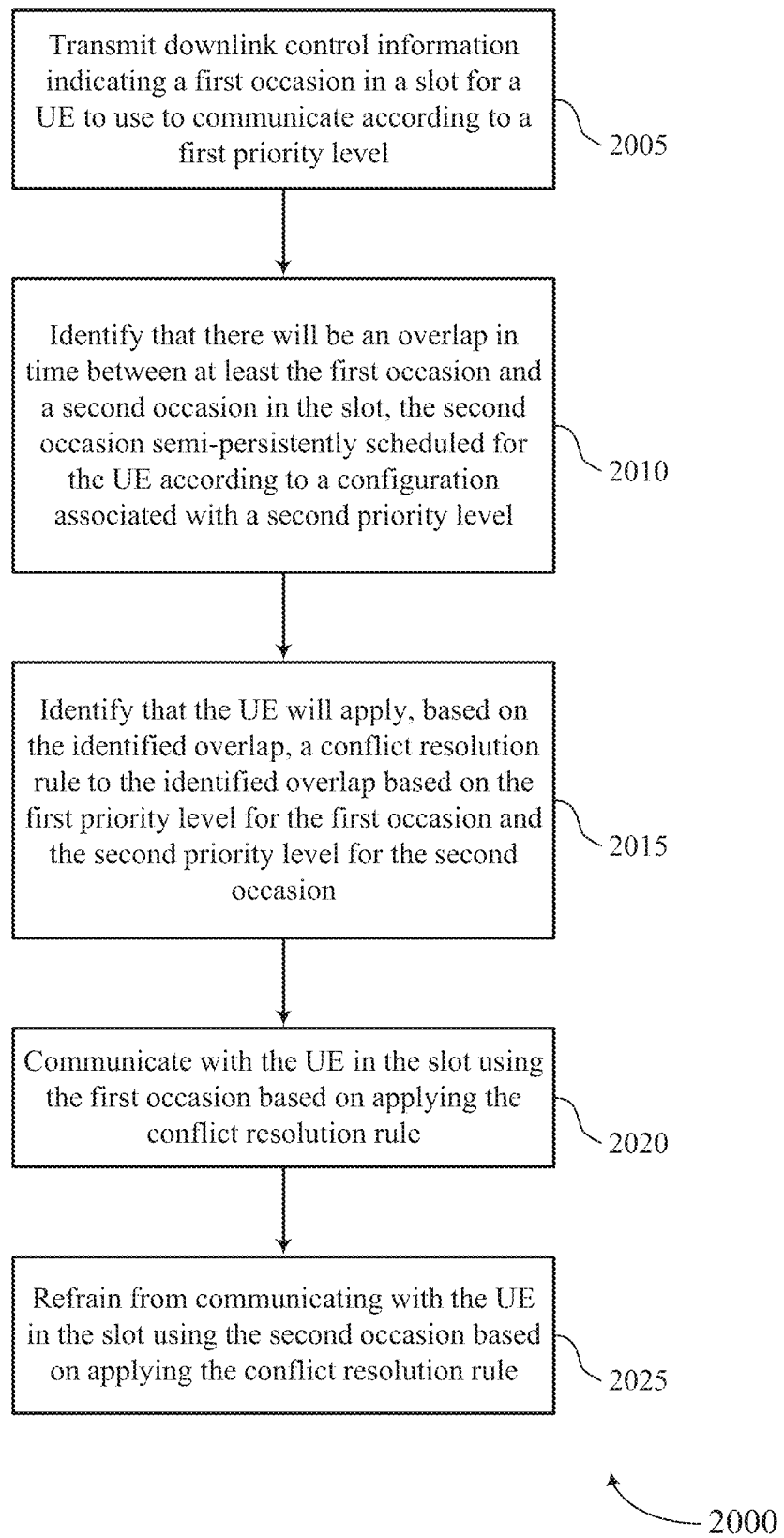

FIG. 20 shows a flowchart illustrating a method 2000 that supports multiple configurations with overlapping occasions in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may transmit downlink control information indicating a first occasion in a slot for a UE to use to communicate according to a first priority level. The operations of 2005 may be performed according to the methods described herein. In some examples, aspects of the operations of 2005 may be performed by a downlink control information component as described with reference to FIGS. 13 through 16.

At 2010, the base station may identify that there will be an overlap in time between at least the first occasion and a second occasion in the slot, the second occasion semi-persistently scheduled for the UE according to a configuration associated with a second priority level. The operations of 2010 may be performed according to the methods described herein. In some examples, aspects of the operations of 2010 may be performed by an overlap identification component as described with reference to FIGS. 13 through 16.

At 2015, the base station may identify that the UE will apply, based on the identified overlap, a conflict resolution rule to the identified overlap based on the first priority level for the first occasion and the second priority level for the second occasion. The operations of 2015 may be performed according to the methods described herein. In some examples, aspects of the operations of 2015 may be performed by a conflict resolution rule component as described with reference to FIGS. 13 through 16.

At 2020, the base station may communicate with the UE in the slot using the first occasion based on applying the conflict resolution rule. The operations of 2020 may be performed according to the methods described herein. In some examples, aspects of the operations of 2020 may be performed by a communication component as described with reference to FIGS. 13 through 16.

At 2025, the base station may refrain from communicating with the UE in the slot using the second occasion based on applying the conflict resolution rule. The operations of 2025 may be performed according to the methods described herein. In some examples, aspects of the operations of 2025 may be performed by a communication component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a first quantity of occasions of a shared channel that the UE is capable of receiving in a slot;
    determining, based at least in part on the identified first quantity of occasions, a maximum quantity of occasions semi-persistently scheduled for the UE in the slot;
    identifying an overlap in time between at least a first occasion and a second occasion in the slot, the first occasion semi-persistently scheduled for the UE according to a first configuration associated with a first priority level, and the second occasion semi-persistently scheduled for the UE according to a second configuration associated with a second priority level, wherein the slot comprises a plurality of occasions semi-persistently scheduled for the UE, including the first occasion and the second occasion;
    applying, based at least in part on the identified overlap, a conflict resolution rule to the plurality of occasions semi-persistently scheduled for the UE based at least in part on the first priority level for the first occasion and the second priority level for the second occasion;
    determining, based at least in part on the applying the conflict resolution rule, a subset of occasions of the plurality of occasions, the subset including at least the first occasion;
    determining that a second quantity of the subset of occasions exceeds the maximum quantity of occasions;
    communicating in the slot using the maximum quantity of occasions of the subset of occasions, including the first occasion, based at least in part on applying the conflict resolution rule; and
    refraining from communicating in the slot using the second quantity of the subset of occasions, including the second occasion, based at least in part on applying the conflict resolution rule.

2. The method of claim 1, wherein applying the conflict resolution rule comprises:
    determining that a first index value for the first occasion is smaller than a second index value for the second occasion, wherein the UE communicates in the slot using the first occasion based at least in part on the determining, and refrains from communicating in the slot using the second occasion based at least in part on the determining.

3. The method of claim 2, wherein the first priority level and the second priority level are a same priority level.

4. The method of claim 1, wherein applying the conflict resolution rule comprises:
    determining that the first occasion ends before the second occasion ends, wherein the UE refrains from communicating in the slot using the second occasion based at least in part on the determining and the identified overlap.

5. The method of claim 4, further comprising:
    identifying an overlap in time between the second occasion and a third occasion in the slot, wherein the third occasion is semi-persistently scheduled for the UE according to a third configuration associated with a third priority level and does not overlap with the first occasion; and
    communicating in the slot using the third occasion based at least in part on the UE refraining from communicating in the slot using the second occasion.

6. The method of claim 5, wherein the first priority level is higher than the third priority level.

7. The method of claim 1, wherein each occasion of the subset of occasions is associated with an index value, and the maximum quantity of occasions of the subset of occasions correspond to a lowest set of index values.

8. The method of claim 1, further comprising:
    identifying one or more remaining occasions of the subset of occasions based at least in part on the maximum quantity of occasions; and
    refraining from communicating in the slot using the one or more remaining occasions.

9. The method of claim 1, further comprising:
    refraining from providing acknowledgement feedback for occasions semi-persistently scheduled for the UE for which the UE has not received a corresponding data channel signal.

10. The method of claim 1, wherein applying the conflict resolution rule comprises:
    determining to refrain from communicating using occasions in the slot, including the second occasion, associated with the second priority level based at least in part on the conflict resolution rule and the first priority level being higher than the second priority level.

11. The method of claim 10, further comprising:
    identifying that the first priority level is higher than the second priority level.

12. The method of claim 1, wherein applying the conflict resolution rule comprises:
    determining to refrain from communicating using occasions in the slot, including the second occasion, associated with the second priority level that ends within a threshold quantity of symbols of a start of first occasion based at least in part on the conflict resolution rule and the first priority level being higher than the second priority level.

13. The method of claim 12, further comprising:
    identifying that the first priority level is higher than the second priority level.

14. The method of claim 12, further comprising:

determining, by the UE, the threshold quantity of symbols based at least in part on a UE capability for a subcarrier spacing for the slot.

15. The method of claim 1, wherein the first configuration and the second configuration are downlink semi-persistently scheduled configurations.

16. The method of claim 1, wherein the first configuration and the second configuration are uplink configured grant configurations.

17. The method of claim 1, further comprising:
receiving downlink control information indicating a first occasion in a slot for the UE to use to communicate according to a first priority level, wherein identifying the overlap in time between at least the first occasion and the second occasion is based at least in part on receiving the downlink control information.

18. The method of claim 17, wherein the conflict resolution rule indicates that the UE does not expect the first occasion in the slot to have a lower priority than the second occasion in the slot based at least in part on the overlap in time, the first occasion being indicated by downlink control information, and the second occasion being semi-persistently scheduled.

19. The method of claim 17, wherein applying the conflict resolution rule comprises:
identifying that the first priority level and the second priority level are a same priority level; and
determining to refrain from communicating in the slot using the second occasion based at least in part on the conflict resolution rule and the first priority level and the second priority level being the same priority level.

20. The method of claim 17, wherein applying the conflict resolution rule comprises:
identifying that the first priority level is higher than the second priority level; and
determining to refrain from communicating in the slot using the second occasion based at least in part on the conflict resolution rule and the first priority level being higher than the second priority level.

21. The method of claim 17, wherein the received downlink control information comprises a downlink grant of resources for the UE indicating the first occasion, and the configuration is a downlink semi-persistently scheduled configuration.

22. The method of claim 17, wherein the received downlink control information comprises an uplink grant of resources for the UE indicating the first occasion, and the configuration is an uplink semi-persistently scheduled configuration.

23. A method for wireless communication at a base station, comprising:
identifying a first quantity of occasions of a shared channel that a UE is capable of receiving in a slot;
determining, based at least in part on the identified first quantity of occasions, a maximum quantity of occasions semi-persistently scheduled for the UE in the slot;
identifying that there will be an overlap in time between at least a first occasion and a second occasion in the slot, the first occasion semi-persistently scheduled for a user equipment (UE) according to a first configuration associated with a first priority level, and the second occasion semi-persistently scheduled for the UE according to a second configuration associated with a second priority level, wherein the slot comprises a plurality of occasions semi-persistently scheduled for the UE, including the first occasion and the second occasion;
identifying that the UE will apply, based at least in part on the identified overlap, a conflict resolution rule to the plurality of occasions semi-persistently scheduled for the UE based at least in part on the first priority level for the first occasion and the second priority level for the second occasion;
determining, based at least in part on the applying the conflict resolution rule, a subset of occasions of the plurality of occasions, the subset including at least the first occasion;
determining that a second quantity of the subset of occasions exceeds the maximum quantity of occasions;
communicating with the UE in the slot using the maximum quantity of occasions of the subset of occasions, including the first occasion, based at least in part on applying the conflict resolution rule; and
refraining from communicating with the UE in the slot using the second quantity of the subset of occasions, including the second occasion, based at least in part on applying the conflict resolution rule.

24. The method of claim 23, further comprising:
transmitting downlink control information indicating a first occasion in a slot for the UE to use to communicate according to a first priority level.

25. An apparatus for wireless communication at a user equipment (UE), comprising:
a processor,
memory coupled with the processor; and
instructions stored in the memory and executable by the processor to cause the apparatus to:
identifying a first quantity of occasions of a shared channel that the UE is capable of receiving in a slot;
determining, based at least in part on the identified first quantity of occasions, a maximum quantity of occasions semi-persistently scheduled for the UE in the slot;
identify an overlap in time between at least a first occasion and a second occasion in the slot, the first occasion semi-persistently scheduled for the UE according to a first configuration associated with a first priority level, and the second occasion semi-persistently scheduled for the UE according to a second configuration associated with a second priority level, wherein the slot comprises a plurality of occasions semi-persistently scheduled for the UE, including the first occasion and the second occasion;
apply, based at least in part on the identified overlap, a conflict resolution rule to the plurality of occasions semi-persistently scheduled for the UE based at least in part on the first priority level for the first occasion and the second priority level for the second occasion;
determining, based at least in part on the applying the conflict resolution rule, a subset of occasions of the plurality of occasions, the subset including at least the first occasion;
determining that a second quantity of the subset of occasions exceeds the maximum quantity of occasions;
communicate in the slot using the maximum quantity of occasions of the subset of occasions, including the first occasion, based at least in part on applying the conflict resolution rule; and
refrain from communicating in the slot using the second quantity of the subset of occasions, including the second occasion based at least in part on applying the conflict resolution rule.

26. The apparatus of claim 25, wherein the instructions to apply the conflict resolution rule are executable by the processor to cause the apparatus to:
  determine that a first index value for the first occasion is smaller than a second index value for the second occasion, wherein the UE communicates in the slot using the first occasion based at least in part on the determining, and refrains from communicating in the slot using the second occasion based at least in part on the determining.

27. The apparatus of claim 26, wherein the first priority level and the second priority level are a same priority level.

28. The apparatus of claim 25, wherein the instructions to apply the conflict resolution rule are executable by the processor to cause the apparatus to:
  determine that the first occasion ends before the second occasion ends, wherein the UE refrains from communicating in the slot using the second occasion based at least in part on the determining and the identified overlap.

29. The apparatus of claim 28, wherein the instructions are further executable by the processor to cause the apparatus to:
  identify an overlap in time between the second occasion and a third occasion in the slot, wherein the third occasion is semi-persistently scheduled for the UE according to a third configuration associated with a third priority level and does not overlap with the first occasion; and
  communicate in the slot using the third occasion based at least in part on the UE refraining from communicating in the slot using the second occasion.

30. The apparatus of claim 29, wherein the first priority level is higher than the third priority level.

31. The apparatus of claim 25, wherein each occasion of the subset of occasions is associated with an index value, and the maximum quantity of occasions of the subset of occasions correspond to a lowest set of index values.

32. The apparatus of claim 25, wherein the instructions are further executable by the processor to cause the apparatus to:
  identify one or more remaining occasions of the subset of occasions based at least in part on the maximum quantity of occasions; and
  refrain from communicating in the slot using the one or more remaining occasions.

33. The apparatus of claim 25, wherein the instructions are further executable by the processor to cause the apparatus to:
  refrain from providing acknowledgement feedback for occasions semi-persistently scheduled for the UE for which the UE has not received a corresponding data channel signal.

34. The apparatus of claim 25, wherein the instructions to apply the conflict resolution rule are executable by the processor to cause the apparatus to:
  determine to refrain from communicating using occasions in the slot, including the second occasion, associated with the second priority level based at least in part on the conflict resolution rule and the first priority level being higher than the second priority level.

35. The apparatus of claim 34, wherein the instructions are further executable by the processor to cause the apparatus to:
  identify that the first priority level is higher than the second priority level.

36. The apparatus of claim 25, wherein the instructions to apply the conflict resolution rule are executable by the processor to cause the apparatus to:
  determine to refrain from communicating using occasions in the slot, including the second occasion, associated with the second priority level that ends within a threshold quantity of symbols of a start of first occasion based at least in part on the conflict resolution rule and the first priority level being higher than the second priority level.

37. The apparatus of claim 36, wherein the instructions are further executable by the processor to cause the apparatus to:
  identify that the first priority level is higher than the second priority level.

38. The apparatus of claim 36, wherein the instructions are further executable by the processor to cause the apparatus to:
  determine, by the UE, the threshold quantity of symbols based at least in part on a UE capability for a subcarrier spacing for the slot.

39. The apparatus of claim 25, wherein the first configuration and the second configuration are downlink semi-persistently scheduled configurations.

40. The apparatus of claim 25, wherein the first configuration and the second configuration are uplink configured grant configurations.

41. The apparatus of claim 25, wherein the instructions are further executable by the processor to cause the apparatus to:
  receive downlink control information indicating a first occasion in a slot for the UE to use to communicate according to a first priority level, wherein identifying the overlap in time between at least the first occasion and the second occasion is based at least in part on receiving the downlink control information.

42. The apparatus of claim 41, wherein the conflict resolution rule indicates that the UE does not expect the first occasion in the slot to have a lower priority than the second occasion in the slot based at least in part on the overlap in time, the first occasion being indicated by downlink control information, and the second occasion being semi-persistently scheduled.

43. The apparatus of claim 41, wherein the instructions to apply the conflict resolution rule are executable by the processor to cause the apparatus to:
  identify that the first priority level and the second priority level are a same priority level; and
  determine to refrain from communicating in the slot using the second occasion based at least in part on the conflict resolution rule and the first priority level and the second priority level being the same priority level.

44. The apparatus of claim 41, wherein the instructions to apply the conflict resolution rule are executable by the processor to cause the apparatus to:
  identify that the first priority level is higher than the second priority level; and
  determine to refrain from communicating in the slot using the second occasion based at least in part on the conflict resolution rule and the first priority level being higher than the second priority level.

45. The apparatus of claim 41, wherein the received downlink control information comprises a downlink grant of resources for the UE indicating the first occasion, and the configuration is a downlink semi-persistently scheduled configuration.

46. The apparatus of claim 41, wherein the received downlink control information comprises an uplink grant of resources for the UE indicating the first occasion, and the configuration is an uplink semi-persistently scheduled configuration.

47. An apparatus for wireless communication at a base station, comprising:
a processor,
memory coupled with the processor; and
instructions stored in the memory and executable by the processor to cause the apparatus to:
identify a first quantity of occasions of a shared channel that a UE is capable of receiving in a slot;
determine, based at least in part on the identified first quantity of occasions, a maximum quantity of occasions semi-persistently scheduled for the UE in the slot;
identify that there will be an overlap in time between at least a first occasion and a second occasion in the slot, the first occasion semi-persistently scheduled for a user equipment (UE) according to a first configuration associated with a first priority level, and the second occasion semi-persistently scheduled for the UE according to a second configuration associated with a second priority level, wherein the slot comprises a plurality of occasions semi-persistently scheduled for the UE, including the first occasion and the second occasion;
identify that the UE will apply, based at least in part on the identified overlap, a conflict resolution rule to the plurality of occasions semi-persistently scheduled for the UE based at least in part on the first priority level for the first occasion and the second priority level for the second occasion;
determining, based at least in part on the applying the conflict resolution rule, a subset of occasions of the plurality of occasions, the subset including at least the first occasion;
determining that a second quantity of the subset of occasions exceeds the maximum quantity of occasions;
communicate with the UE in the slot using the maximum quantity of occasions of the subset of occasions, including the first occasion, based at least in part on applying the conflict resolution rule; and
refrain from communicating with the UE in the slot using the second quantity of the subset of occasions, including the second occasion, based at least in part on applying the conflict resolution rule.

48. The apparatus of claim 47, wherein the instructions are further executable by the processor to cause the apparatus to:
transmit downlink control information indicating a first occasion in a slot for the UE to use to communicate according to a first priority level.

* * * * *